United States Patent
Christie et al.

(10) Patent No.: US 6,430,195 B1
(45) Date of Patent: *Aug. 6, 2002

(54) BROADBAND TELECOMMUNICATIONS SYSTEM INTERFACE

(75) Inventors: Joseph Michael Christie, *deceased*, late of Overland Park, KS (US); by Joseph S. Christie, legal representative; by Jean M. Christie, legal representative, both of Mt. Pleasant, PA (US); Michael Joseph Gardner, Overland Park, KS (US); Tracy Lee Nelson, Shawnee Mission, KS (US); William Lyle Wiley, Olathe, KS (US); Albert Daniel Duree, Independence, MO (US)

(73) Assignee: Sprint Communications Company L.P., Kansas City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/755,523

(22) Filed: Nov. 22, 1996

(Under 37 CFR 1.47)

Related U.S. Application Data

(63) Continuation-in-part of application No. 08/525,050, filed on Sep. 8, 1995, now Pat. No. 5,991,301, which is a continuation of application No. 08/238,605, filed on May 5, 1994.

(51) Int. Cl.[7] ............................. H04J 3/16; H04L 12/28
(52) U.S. Cl. .................. 370/465; 370/395; 370/522; 370/467
(58) Field of Search .................................. 370/465, 466, 370/433, 435, 437, 439, 522, 907, 395, 384, 467, 434, 436, 438, 463, 524, 400, 385; 379/399, 220, 224, 229, 231, 225, 230

(56) References Cited

U.S. PATENT DOCUMENTS 4,201,889 A    5/1980   Lawrence et al.

(List continued on next page.)

FOREIGN PATENT DOCUMENTS

| AU | B2385392 | 3/1993 |
| DE | 4225203 A1 | 12/1992 |
| DE | 195 34 754 C1 | 11/1996 |

(List continued on next page.)

OTHER PUBLICATIONS

Kuribayashi, S., "Advanced Signaling Protocol for Broadband ISDN Service," Electronics and Communications in Japan, NTT Communication Switching Laboratories (Musashino, Japan), vol. 78 (No. 1), p. 12, (Dec. 13, 1995).

(List continued on next page.)

*Primary Examiner*—Wellington Chin
*Assistant Examiner*—Steven Nguyen
(74) *Attorney, Agent, or Firm*—Harle R. Ball; Steven J. Funk; Kevin D. Robb

(57) ABSTRACT

The invention is a system for interfacing an ISDN or non-ISDN system with a broadband system. The broadband system can be an ATM system. The invention can process the ISDN signaling to select ATM connections and then interwork the ISDN connections with the selected ATM connections. The invention can interwork ISDN signaling and SS7 signaling. The invention can also process SS7 signaling to select ISDN connections and then interwork ATM connections with the selected ISDN connections. The invention can also interwork ISDN systems with non-ISDN systems.

32 Claims, 19 Drawing Sheets

U.S. PATENT DOCUMENTS

| | | | |
|---|---|---|---|
| 4,310,727 A | 1/1982 | Lawser | |
| 4,348,554 A | 9/1982 | Asmuth | |
| 4,453,247 A | 6/1984 | Suzuki et al. | |
| 4,554,659 A | 11/1985 | Blood et al. | |
| 4,565,903 A | 1/1986 | Riley | |
| 4,683,563 A | 7/1987 | Rouse et al. | |
| 4,720,850 A | 1/1988 | Oberlander et al. | |
| 4,730,312 A | 3/1988 | Johnson | |
| 4,736,364 A | 4/1988 | Basso et al. | |
| 4,748,658 A | 5/1988 | Gopal | |
| 4,757,526 A | 7/1988 | Foster | |
| 4,763,317 A | 8/1988 | Lehman et al. | |
| 4,823,338 A | 4/1989 | Chan et al. | |
| 4,853,955 A | 8/1989 | Thorn et al. | |
| 4,896,319 A | 1/1990 | Lidinsky et al. | |
| 4,916,690 A | 4/1990 | Barri | |
| 4,926,416 A | 5/1990 | Weik | |
| 4,979,118 A | 12/1990 | Kheradpir | |
| 4,985,889 A | 1/1991 | Frankish et al. | |
| 4,991,204 A | 2/1991 | Yamamoto et al. | |
| 4,993,014 A | 2/1991 | Gordon | |
| 4,993,104 A | 2/1991 | Gordon | |
| 5,003,584 A | 3/1991 | Benyacar | |
| 5,018,191 A | 5/1991 | Catron et al. | |
| 5,036,318 A | 7/1991 | Bachhuber et al. | |
| 5,048,081 A | 9/1991 | Gavaras | |
| 5,058,104 A | 10/1991 | Yonehara et al. | |
| 5,067,123 A | 11/1991 | Hyodo et al. | |
| 5,073,890 A | 12/1991 | Danielsen | |
| 5,084,867 A | 1/1992 | Tachibana et al. | |
| 5,086,461 A | 2/1992 | Thorn et al. | |
| 5,089,954 A | 2/1992 | Rago | |
| 5,091,903 A | 2/1992 | Schrodi | |
| 5,101,404 A | 3/1992 | Kunimoto et al. | |
| 5,115,431 A | 5/1992 | Williams et al. | |
| 5,163,057 A | 11/1992 | Grupp | |
| 5,168,492 A | 12/1992 | Beshai et al. | |
| 5,179,556 A | 1/1993 | Turner | |
| 5,185,743 A | 2/1993 | Murayama | |
| 5,193,110 A | 3/1993 | Jones et al. | |
| 5,204,857 A | 4/1993 | Obara | |
| 5,216,669 A | 6/1993 | Hofstetter et al. | |
| 5,218,602 A | 6/1993 | Grant et al. | |
| 5,231,631 A | 7/1993 | Buhrke et al. | |
| 5,231,633 A | 7/1993 | Hluchyj et al. | |
| 5,233,607 A | 8/1993 | Barwig et al. | |
| 5,239,539 A | 8/1993 | Uchida et al. | |
| 5,239,542 A | 8/1993 | Breidenstein et al. | |
| 5,249,178 A | 9/1993 | Kurano et al. | |
| 5,251,255 A | 10/1993 | Epley | |
| 5,253,247 A | 10/1993 | Hirose et al. | |
| 5,255,266 A | 10/1993 | Watanabe et al. | |
| 5,258,752 A | 11/1993 | Fukaya et al. | |
| 5,258,979 A | 11/1993 | Oomuro et al. | |
| 5,268,895 A | 12/1993 | Topper | |
| 5,271,010 A | 12/1993 | Miyake | |
| 5,274,680 A | 12/1993 | Sorton et al. | |
| 5,278,889 A | 1/1994 | Papanicolaou et al. | |
| 5,282,244 A | 1/1994 | Fuller et al. | |
| 5,285,441 A | 2/1994 | Bansal et al. | |
| 5,289,472 A * | 2/1994 | Cho | 370/467 |
| 5,291,479 A | 3/1994 | Vaziri et al. | |
| 5,291,492 A | 3/1994 | Andrews et al. | |
| 5,311,509 A | 5/1994 | Heddes et al. | |
| 5,317,562 A | 5/1994 | Nardin et al. | |
| 5,323,389 A | 6/1994 | Bitz et al. | |
| 5,327,421 A | 7/1994 | Hiller et al. | |
| 5,327,433 A | 7/1994 | Hall | |
| 5,329,308 A | 7/1994 | Binns et al. | |
| 5,339,318 A | 8/1994 | Tanaka | |
| 5,345,443 A * | 9/1994 | D'Ambrogio et al. | 370/524 |
| 5,345,445 A | 9/1994 | Hiller | |
| 5,345,446 A | 9/1994 | Hiller | |
| 5,357,510 A | 10/1994 | Norizuki et al. | |
| 5,363,433 A | 11/1994 | Isono | |
| 5,365,524 A | 11/1994 | Hiller et al. | |
| 5,367,566 A | 11/1994 | Moe et al. | |
| 5,373,504 A | 12/1994 | Tanaka et al. | |
| 5,375,124 A | 12/1994 | D'Ambrogio | |
| 5,377,186 A | 12/1994 | Wegner | |
| 5,384,771 A | 1/1995 | Isidoro et al. | |
| 5,384,840 A | 1/1995 | Blatchford et al. | |
| 5,392,402 A | 2/1995 | Robrock | |
| 5,394,393 A | 2/1995 | Brisson et al. | |
| 5,394,398 A | 2/1995 | Rau | |
| 5,400,339 A * | 3/1995 | Sekine et al. | 370/522 |
| 5,414,701 A | 5/1995 | Shtayer et al. | |
| 5,418,783 A | 5/1995 | Yamaki et al. | |
| 5,420,857 A | 5/1995 | Jurkevich | |
| 5,420,858 A | 5/1995 | Marshall et al. | |
| 5,420,916 A | 5/1995 | Sekiguchi | |
| 5,422,882 A | 6/1995 | Hiller | |
| 5,425,090 A | 6/1995 | Orriss | |
| 5,426,636 A | 6/1995 | Hiller et al. | |
| 5,428,607 A | 6/1995 | Hiller et al. | |
| 5,428,609 A | 6/1995 | Eng et al. | |
| 5,434,852 A | 7/1995 | LaPorta | |
| 5,434,981 A | 7/1995 | Lenihan et al. | |
| 5,440,563 A | 8/1995 | Isidoro et al. | |
| 5,440,626 A | 8/1995 | Boyle et al. | |
| 5,444,713 A | 8/1995 | Backaus et al. | |
| 5,446,738 A | 8/1995 | Kim et al. | |
| 5,452,297 A | 9/1995 | Hiller et al. | |
| 5,453,981 A | 9/1995 | Katsube et al. | |
| 5,454,034 A | 9/1995 | Martin | |
| 5,457,684 A | 10/1995 | Bharucha | |
| 5,461,669 A | 10/1995 | Vilain | |
| 5,463,620 A | 10/1995 | Sriram | |
| 5,463,621 A | 10/1995 | Suzuki | |
| 5,473,677 A | 12/1995 | D'Amato | |
| 5,473,679 A | 12/1995 | LaPorta | |
| 5,477,537 A | 12/1995 | Dankert et al. | |
| 5,479,401 A | 12/1995 | Bitz et al. | |
| 5,479,402 A | 12/1995 | Hata et al. | |
| 5,479,495 A | 12/1995 | Blumhardt | |
| 5,483,527 A | 1/1996 | Doshi et al. | |
| 5,485,455 A | 1/1996 | Dobbins et al. | |
| 5,490,251 A * | 2/1996 | Clark et al. | 370/524 |
| 5,495,484 A | 2/1996 | Self et al. | |
| 5,499,290 A * | 3/1996 | Koster | 370/524 |
| 5,504,742 A | 4/1996 | Kakuma et al. | |
| 5,506,844 A | 4/1996 | Rao | |
| 5,509,010 A | 4/1996 | LaPorta | |
| 5,509,123 A | 4/1996 | Dobbins et al. | |
| 5,513,178 A | 4/1996 | Tanaka | |
| 5,519,707 A | 5/1996 | Subramanian et al. | |
| 5,521,910 A | 5/1996 | Matthews | |
| 5,522,042 A | 5/1996 | Fee et al. | |
| 5,526,414 A | 6/1996 | Bedard et al. | |
| 5,530,698 A | 6/1996 | Kozaki et al. | |
| 5,530,724 A | 6/1996 | Abrams et al. | |
| 5,533,106 A | 7/1996 | Blumhardt | |
| 5,539,698 A | 7/1996 | Kozaki et al. | |
| 5,539,815 A | 7/1996 | Samba | |
| 5,539,816 A | 7/1996 | Pinard et al. | |
| 5,539,884 A | 7/1996 | Robrock | |
| 5,541,918 A | 7/1996 | Ganmukhi et al. | |
| 5,541,926 A | 7/1996 | Saito et al. | |
| 5,544,152 A | 8/1996 | Obermanns et al. | |
| 5,544,161 A | 8/1996 | Bigham et al. | |
| 5,546,398 A | 8/1996 | Tucker et al. | |

| | | |
|---|---|---|
| 5,548,580 A | 8/1996 | Buckland |
| 5,550,819 A | 8/1996 | Duault |
| 5,550,834 A | 8/1996 | D'Ambrogio et al. |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi |
| 5,570,368 A | 10/1996 | Murakami et al. |
| 5,577,039 A | 11/1996 | Won et al. |
| 5,579,311 A | 11/1996 | Chopping et al. |
| 5,586,177 A | 12/1996 | Farris et al. |
| 5,587,999 A | 12/1996 | Endo |
| 5,592,477 A | 1/1997 | Farris et al. |
| 5,600,640 A | 2/1997 | Blair et al. |
| 5,600,643 A | 2/1997 | Robrock |
| 5,621,728 A | 4/1997 | Lightfoot et al. |
| 5,623,491 A | 4/1997 | Skoog |
| 5,627,836 A | 5/1997 | Conoscenti et al. |
| 5,629,930 A | 5/1997 | Beshai et al. |
| 5,635,980 A | 6/1997 | Lin et al. |
| 5,636,210 A | 6/1997 | Agrawal et al. |
| 5,636,261 A | 6/1997 | Fils |
| 5,640,446 A | 6/1997 | Everett et al. |
| 5,661,725 A | 8/1997 | Buck et al. |
| 5,666,349 A | 9/1997 | Petri |
| 5,673,262 A | 9/1997 | Shimizu |
| 5,680,390 A | 10/1997 | Robrock |
| 5,684,792 A | 11/1997 | Ishihara |
| 5,703,876 A * | 12/1997 | Christie ..................... 370/486 |
| 5,708,702 A | 1/1998 | DePaul et al. |
| 5,710,769 A | 1/1998 | Anderson et al. |
| 5,719,863 A | 2/1998 | Hummel |
| 5,751,706 A | 5/1998 | Land |
| 5,796,813 A | 8/1998 | Sonnenberg |
| 5,802,045 A | 9/1998 | Kos |
| 5,818,919 A | 10/1998 | Berberich, Jr. et al. |
| 5,825,780 A | 10/1998 | Christie |
| 5,832,383 A | 11/1998 | Yahagi |
| 5,835,566 A | 11/1998 | Cowgill |
| 5,845,211 A * | 12/1998 | Roach, Jr. ................... 455/436 |
| 5,848,128 A | 12/1998 | Frey |
| 5,854,836 A | 12/1998 | Nimmagadda |
| 5,867,570 A | 2/1999 | Bargout et al. |
| 5,867,571 A | 2/1999 | Borchering |
| 5,920,562 A | 7/1999 | Christie et al. |
| 5,926,482 A | 7/1999 | Christie |
| 5,940,491 A | 8/1999 | Anderson et al. |
| 5,953,338 A | 9/1999 | Ma |
| 5,991,301 A | 11/1999 | Christie |

FOREIGN PATENT DOCUMENTS

| | | |
|---|---|---|
| EP | 0403414 A2 | 12/1990 |
| EP | 0426911 A1 | 5/1991 |
| EP | 90312739.7 | 7/1991 |
| EP | 91303312.2 | 10/1991 |
| EP | 0460843 A2 | 12/1991 |
| EP | 0466078 A2 | 1/1992 |
| EP | 91311342.9 | 7/1992 |
| EP | 0539016 A2 | 4/1993 |
| EP | 0549016 A1 | 6/1993 |
| EP | 92307752.3 | 9/1993 |
| EP | 0582418 A2 | 2/1994 |
| EP | 0592152 A2 | 4/1994 |
| EP | 592153 A2 | 4/1994 |
| EP | 592154 A2 | 4/1994 |
| EP | 0793393 A2 | 9/1997 |
| EP | 0863679 A2 | 9/1998 |
| HU | 216229 B | 5/1999 |
| HU | 216230 B | 5/1999 |
| JP | 870284896 | 5/1989 |
| JP | 07050057 | 9/1996 |
| WO | WO9318598 | 9/1993 |
| WO | WO 94/05121 | 3/1994 |
| WO | WO94/06251 | 7/1994 |
| WO | WO 94/28660 | 12/1994 |
| WO | WO95/04436 | 2/1995 |
| WO | WO95/07586 | 3/1995 |
| WO | WO 95/08881 | 3/1995 |

OTHER PUBLICATIONS

McKinney, R. S., "ATM for Narrowband Services" IEEE Communications Magazine, IEEE (New York, US), vol. 32 (No. 4), p. 9, (Apr. 13, 1994).

Tsuboya, "ATM For Low Bitrate Voice", ATM Forum Technical Committee 95–1286, Oct. 2–6, 1995.

Babiarz, "Education Module For Voice And Telephone Over ATM," Forum Technical Committee, 95–1255, Oct. 1–6, 1995.

Yoneda, "J2 Circuit Emulation Service—Proposal For Changes/Additions To Circuit Emulation Service Interoperability Specification", ATM Forum Technical Committee 95–1136, Oct. 2–6, 1995.

Chase, "Voice And Telephony Over ATM Meeting Report Toronto, Canada Aug. 7–11, 1995", ATM Forum Technical Committee 95–1109, Oct. 2–6, 1995.

Rec. I. 312, "ISDN—Principles Of Intelligent Network Architecture." ITU—Telecommunication Standardization Sector, Oct. 1992Rec. Q. 1201, "Overall Network Aspects And Functions, ISDN User–Network Interfaces—Principles Of Intelligent Network Architecture." ITU—Telecommunication Standardization Sector, Oct. 1992.

Rec. Q. 1200. "General Recommendations On Telephone Switching And Signaling—Intelligent Network—Q–Series Intelligent Network Recommendation Structure." ITU—Telecommunication Standardization Sector, Sep. 1997.

Rec. Q. 1218, "General Recommendations On Telephone Switching And Signaling—Intelligent Network—Interface Recommendation For Intelligent Network CS–1." ITU—Telecommunication Standardization Sector, Oct. 1995.

Jordan, Bell Operating Company Intelligent Voice Networks And Services, Bell Communications Research, (New Jersey) pp. 100–113.

Ohta, Satoru, "A Dynamically Controllable ATM Transport Network Based on the Virtual Path Concept" IEEE 1988, pp. 1272–1276.

Barr, W.J., et al., The TINA Initiative, IEEE Communications Magazine, vol. 31, No. 3, Mar. 1993, New York, pp. 70–76, Mar., 1993.

Chen, S., et al., Intelligent Networking For The Global Marketplace, IEEE Communications Magazine, vol. 31, No. 3, Mar. 1993, York, pp. 86–92.

Fujioka, M., et al., Hierarchical And Distributed Information Handling For UPT, IEEE Network Magazine, Nov., 1990.

Gilmour, J., et al., Intelligent Network/2: The Architecture—The Technical Challenges—The Opportunities, IEEE Communications Magazine, vol. 26, No. 12, Dec. 1988, New York, pp. 8–11 and 63.

Weisser, F. J., et al., The Intelligent Network and Forward–Looking Technology, IEEE Communications Magazine, vol. 26, No. 12, Dec. 1988, New York, pp. 64–69.

General Recommendations On Telephone Switching And Signlaing Intelligent Network–Intelligent Network Physical Place Architecture Q.1205, ITU_T Recommendation, Telecommunication Standardization Sector of ITU.

"General Recommendations On Telephone Switching And Signaling—Intelligent Network/Distributed Functional Plane For Intelligent Network CS–1," ITU–T Recommendation Q.1214, ITU–Telecommunication Standardization Sector.

U.S. patent application Ser. No. 08/525,050, filed Sep. 8, 1995.

U.S. patent application Ser. No. 08/594,660, filed Feb. 2, 1996.

U.S. patent application Ser. No. 08/594,661, filed Feb. 2, 1996.

U.S. patent application Ser. No. 08/754,354, filed Nov. 22, 1996.

U.S. patent application Ser. No. 09/082,048, filed May 20, 1998.

U.S. patent application Ser. No. 09/123,162, filed Jul. 27, 1998.

U.S. patent application Ser. No. 09/276,217, filed Mar. 25, 1999.

U.S. patent application Ser. No. 09/353,401, filed Jul. 15, 1999.

U.S. patent application Ser. No. 09/392,489, filed Sep. 9, 1999.

U.S. patent application Ser. No. 09/420,712, filed Oct. 20, 1999.

U.S. patent application Ser. No. 09/420,914, filed Oct. 20, 1999.

U.S. patent application Ser. No. 09/421,718, filed Oct. 20, 1999.

U.S. patent application Ser. No. 09/438,668, filed Nov. 12, 1999.

U.S. patent application Ser. No. 09/438,669, filed Nov. 12, 1999.

U.S. patent application Ser. No. 09/438,807, filed Nov. 12, 1999.

U.S. patent application Ser. No. 09/439,033, filed Nov. 12, 1999.

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9 (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research Exchange, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communications Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van den Broek, W., et al., "RACE 2066—Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

N/A, "ANSI–TI.111–1992, Signaling System No. 7 (SS7)—Message Transfer Part (MTP)," American National Standard for Telecommunications.

N/A, "ANSI–TI–112–1992, Signal System No. 7 (SS7)—Signaling Connection Control Part (SCCP)," American National Standard for Telecommunications.

N/A, "ANSI–TI.113–1992, Signal System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (Ver 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level-3 Gateway STP Release 3.2.0," Tekelec, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Drobrowski, George, "Principles of Signaling for Cell Relay and Frame Relay," DVI Comm., Inc./Stevens Institute of Technology/Bell Comm. Research (Bellcore), p. 1–2, 5–6 and 229, (1994).

N/A, "B–IDSN ATM Adaptation Layer (AAL) Specification, Types 1 & 2," ITU Draft Recommendations I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband/Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revised Draft of Q.2650 (DSS2/B–ISUP Interworking Recommendation),"0 ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendations on Telephone Switching and Signalling—Intelligent Network/Distributed Functional Plane for Intelligent CS-1," ITU–T Recommendation Q.1214.

Kumar, Sanjay, "Legacy Voice Service at ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee (Oct. 2–6, 1995).

Schink, Helmut, et al., "CES as a Flexible Trunking Method," ATM_Forum/95–1157, ATM Forum Technical Committee, Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration–-ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modificaitons for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee 11 Contribution, (Feb. 1995).

Beckman, Richard T. and Mathews, Joseph R., "Proposal for a Physical Architecture Based on the Harmonized Functional Architecture," T1S1.5/95–027, Committee T1 Contribution, (Feb. 20–24, 1995).

U.S. patent application Ser. No. 09/082,165, filed May 20, 1998.

U.S. patent application Ser. No. 09/082,040, filed May 20, 1998.

U.S. patent application Ser. No. 09/082,045, filed May 20, 1998.

U.S. patent application Ser. No. 09/082,048, filed May 20, 1998.

U.S. patent application Ser. No. 09/082,049, filed May 20, 1998.

U.S. patent application Ser. No. 09/082,393, filed May 20, 1998.

U.S. patent application Ser. No. 09/081,166, filed May 20, 1998.

U.S. patent application Ser. No. 09/081,900, filed May 20, 1998.

U.S. patent application Ser. No. 09/081,891, filed May 20, 1998.

U.S. patent application Ser. No. 09/082,181, filed May 20, 1998.

U.S. patent application Ser. No. 09/082,182, filed May 20, 1998.

U.S. patent application Ser. No. 09/082,344, filed May 20, 1998.

U.S. patent application Ser. No. 09/082,180, filed May 20, 1998.

U.S. patent application Ser. No. 08/525,868, filed Sep. 8, 1995.

U.S. patent application Ser. No. 09/116,868, filed Jul. 16, 1998.

U.S. patent application Ser. No. 09/116,966, filed Jul. 16, 1998.

U.S. patent application Ser. No. 08/525,897, filed Sep. 8, 1995.

U.S. patent application Ser. No. 08/525,050, filed Sep. 8, 1995.

U.S. patent application Ser. No. 08/933,297, filed Sep. 19, 1997.

U.S. patent application Ser. No. 08/855,621, filed May 13, 1997.

U.S. patent application Ser. No. 08/594,661, filed Feb. 2, 1996.

U.S. patent application Ser. No. 08/594,660, filed Feb. 2, 1996.

U.S. patent application Ser. No. 08/594,662, filed Feb. 2, 1996.

U.S. patent application Ser. No. 08/754,847, filed Nov. 22, 1996.

U.S. patent application Ser. No. 08/754,849, filed Nov. 22, 1996.

U.S. patent application Ser. No. 08/755,268, filed Nov. 22, 1996.

U.S. patent application Ser. No. 08/755,438, filed Nov. 22, 1996.

U.S. patent application Ser. No. 08/653,852, filed May 28, 1996.

U.S. patent application Ser. No. 09/118,604, filed Jul. 17, 1998.

U.S. patent application Ser. No. 08/754,846, filed Nov. 22, 1996.

U.S. patent application Ser. No. 09/080,393, filed May 18, 1998.

U.S. patent application Ser. No. 08/853,843, filed May 9, 1997.

U.S. patent application Ser. No. 08/754,354, filed Nov. 22, 1996.

U.S. patent application Ser. No. 08/754,349, filed Nov. 22, 1996.

U.S. patent application Ser. No. 08/854,194, filed May 9, 1997.

U.S. patent application Ser. No. 08/921,876, filed Sep. 2, 1997.

U.S. patent application Ser. No. 09/026,872, filed Feb. 20, 1998.

U.S. patent application Ser. No. 08/840,317, filed Apr. 16, 1997.

U.S. patent application Ser. No. 09/027,416, filed Feb. 20, 1998.

U.S. patent application Ser. No. 08/922,196, filed Sep. 2, 1997.

U.S. patent application Ser. No. 08/923,762, filed Sep. 2, 1997.

U.S. patent application Ser. No. 09/026,906, filed Feb. 20, 1998.

U.S. patent application Ser. No. 09/027,008, filed Feb. 20, 1998.

U.S. patent application Ser. No. 09/027,022, filed Feb. 20, 1998.

U.S. patent application Ser. No. 09/026,766, filed Feb. 20, 1998.

U.S. patent application Ser. No. 09/058,642, filed Apr. 10, 1998.

U.S. patent application Ser. No. 08/568,551, filed Dec. 7, 1995.

U.S. patent application Ser. No. 08/525,868, filed Sep. 8, 1995.

U.S. patent application Ser. No. 08/525,897, filed Sep. 8, 1995.
U.S. patent application Ser. No. 08/525,050, filed Sep. 8, 1995.
U.S. patent application Ser. No. 08/933,297, filed Sep. 19, 1997.
U.S. patent application Ser. No. 08/855,621, filed May 13, 1997.
U.S. patent application Ser. No. 08/594,661, filed Feb. 2, 1996.
U.S. patent application Ser. No. 08/594,660, filed Feb. 2, 1996.
U.S. patent application Ser. No. 08/594,662, filed Feb. 2, 1996.
U.S. patent application Ser. No. 08/754,847, filed Nov. 22, 1996.
U.S. patent application Ser. No. 08/754,849, filed Nov. 22, 1996.
U.S. patent application Ser. No. 08/755,268, filed Nov. 22, 1996.
U.S. patent application Ser. No. 08/755,438, filed Nov. 22, 1996.
U.S. patent application Ser. No. 08/653,852, filed May 28, 1996.
U.S. patent application Ser. No. 08/754,846, filed Nov. 22, 1996.
U.S. patent application Ser. No. 08/853,843, filed May 9, 1997.
U.S. patent application Ser. No. 08/754,354, filed Nov. 22, 1996.
U.S. patent application Ser. No. 08/754,349, filed Nov. 22, 1996.
U.S. patent application Ser. No. 08/854,194, filed May 9, 1997.
U.S. patent application Ser. No. 08/921,876, filed Sep. 2, 1997.
U.S. patent application Ser. No. 09/026,872, filed Feb. 20, 1998.
U.S. patent application Ser. No. 08/840,317, filed Apr. 16, 1997.
U.S. patent application Ser. No. 09/027,416, filed Feb. 20, 1998.
U.S. patent application Ser. No. 08/922,196, filed Sep. 2, 1997.
U.S. patent application Ser. No. 08/923,762, filed Sep. 2, 1997.
U.S. patent application Ser. No. 09/026,906, filed Feb. 20, 1998.
U.S. patent application Ser. No. 09/027,008, filed Feb. 20, 1998.
U.S. patent applicaiton Ser. No. 09/027,022, filed Feb. 20, 1998.
U.S. patent application Ser. No. 09/026,766, filed Feb. 20, 1998.
U.S. patent application Ser. No. 09/058,642, filed Apr. 10, 1998.

* cited by examiner

FIG. 17

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/DATE |
|---|---|---|---|---|---|---|---|---|---|---|---|---|
| | | | | | | | | | | | | |
| | | | | | | | | | | | | |
| | | | | | | | | | | | | |

FIG. 18

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 19

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |
| | | | | | | | |

FIG. 20

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 21

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 22

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |
| | | | | | | | | | | | |

FIG. 23

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 24*

BROADBAND TELECOMMUNICATIONS SYSTEM INTERFACE

RELATED APPLICATIONS

This application is a continuation-in-part of Ser. No. 08/525,050 now prior U.S. Pat. No. 5,991,301, filed on Sep. 8, 1995, entitled "BROADBAND TELECOMMUNICATIONS SYSTEM," and which is a continuation of prior abandoned U.S. patent application Ser. No. 08/238,605, filed on May 5, 1994, entitled "METHOD, SYSTEM AND APPARATUS FOR TELECOMMUNICATIONS CONTROL," which is hereby incorporated by reference into this application.

FEDERALLY SPONSERED RESEARCH OR DEVELOPMENT

Not applicable

MICROFICHE APPENDIX

Not applicable

BACKGROUND OF THE INVENTION

1. Field of the Invention

The invention relates to telecommunications, and in particular, to systems that provide access to broadband systems from Integrated Services Digital Network (ISDN) systems or systems that can be converted into the ISDN format.

2. Background of the Prior Art

FIG. 1 depicts a common prior art arrangement for local telecommunications access. Shown are Customer Premises Equipment (CPE) that are connected to a local switch. Typically, there is more CPE connected to each local switch, but the number depicted has been restricted for purposes of clarity. A standard connection between CPE and the local switch is the well known Time Division Multiplexed (TDM) connection using the Extended Superframe (ESF) format. The TDM/ESF connection allows multiple devices at the customer site to access the local switch and obtain telecommunications services.

TDM employs time division multiplexing to combine multiple communications paths into a single digital signal. ESF employs robbed bit signaling. In robbed-bit signaling, particular bits of user information in the bearer channels are replaced by signaling information. Thus, these signaling bits are "robbed" from the user bearer channels. In ESF, the robbed bits are known as the ABCD bits. Since the ABCD bits are integrated into the bearer channels, ABCD robbed-bit signaling is an "in-band" signaling system. Examples of information carried by the ABCD bits are off-hook and on-hook conditions. ESF and ABCD robbed-bit signaling are well known in the art.

The ISDN format is also well known. ISDN provides a user with a digital connection to the local switch that has more bandwidth and control than a conventional local loop. ISDN has bearer channels (B) and a signaling channel (D) that are typically combined at the primary rate (23B+D) or at the basic rate (2B+D). Because ISDN has a separate signaling channel (the D channel), it has an out-of-band signaling system.

At present, broadband systems are being developed and implemented. Broadband systems provide telecommunications service providers with many benefits, including higher capacities, more efficient use of bandwidth, and the ability to integrate voice, data, and video traffic. These broadband systems provide callers with increased capabilities at lower costs. However, CPE using the TDM, ISDN or similar formats cannot directly access these broadband systems. These systems need an interworking interface to the sophisticated broadband systems. Telecommunications service providers also need such an interface in order to use their broadband systems to provide services to CPE that use ISDN format or a format that can be converted into ISDN.

SUMMARY

The invention includes a telecommunications system for use between an Asynchronous Transfer Mode (ATM) system and an ISDN system for telecommunications calls. The telecommunications system comprises a signaling processing system and an ATM multiplexer. The signaling processing system is operational to process call signaling from the ISDN system and from the ATM system. It selects at least one of an ISDN connection and an ATM connection for each call and provides control messages that identify the selected connections. The ATM multiplexer is operational to exchange the call signaling between the ISDN system and the signaling processing system. It also receives the control messages from the signaling processing system and interworks call communications between the ISDN system and the ATM system on the selected connections based on the control messages.

In some embodiments, the invention is also operational to interwork the ISDN signaling and Signaling System #7 (SS7) signaling. In some embodiments, the invention is also operational to interwork between communications and signaling from another system and ISDN bearer communications and ISDN signaling. In some embodiments, the invention is also operational to exchange Signaling System #7 (SS7) signaling with the ATM system. In some embodiments, the invention includes an ATM cross-connect, a signaling processor that is operational to process signaling to select connections, a signaling converter that is operational to interwork ISDN signaling and SS7 signaling, and/or an ISDN converter that is operational to interwork between communications and signaling from the other communications system and ISDN bearer communications and ISDN.

The invention could be a method for operating a telecommunications system that interworks between an ISDN system and an Asyncronous Transfer Mode (ATM) system for telecommunications calls. The method comprises receiving ISDN signaling and ISDN bearer communications into the telecommunications system and converting the ISDN signaling into Signaling System #7 (SS7) signaling. The method includes processing the SS7 signaling to select ATM connections, and interworking the ISDN bearer communications with the selected ATM connections. In some embodiments, the method includes receiving SS7 signaling and ATM communications into the telecommunications system, processing the SS7 signaling to select ISDN connections, and interworking the ATM communications with the selected ISDN connections.

BRIEF DESCRIPTION OF THE DRAWINGS

FIG. 17 depicts an example of the trunk circuit table.

FIG. 18 depicts an example of the trunk group table.

FIG. 19 depicts an example of the exception table.

FIG. 20 depicts an example of the ANI table.

FIG. 22 depicts an example of the called number table.

FIG. 22 depicts an example of the routing table.

FIG. 23 depicts an example of the treatment table.

FIG. 24 depicts an example of the message table.

DETAILED DESCRIPTION

Figure 1:
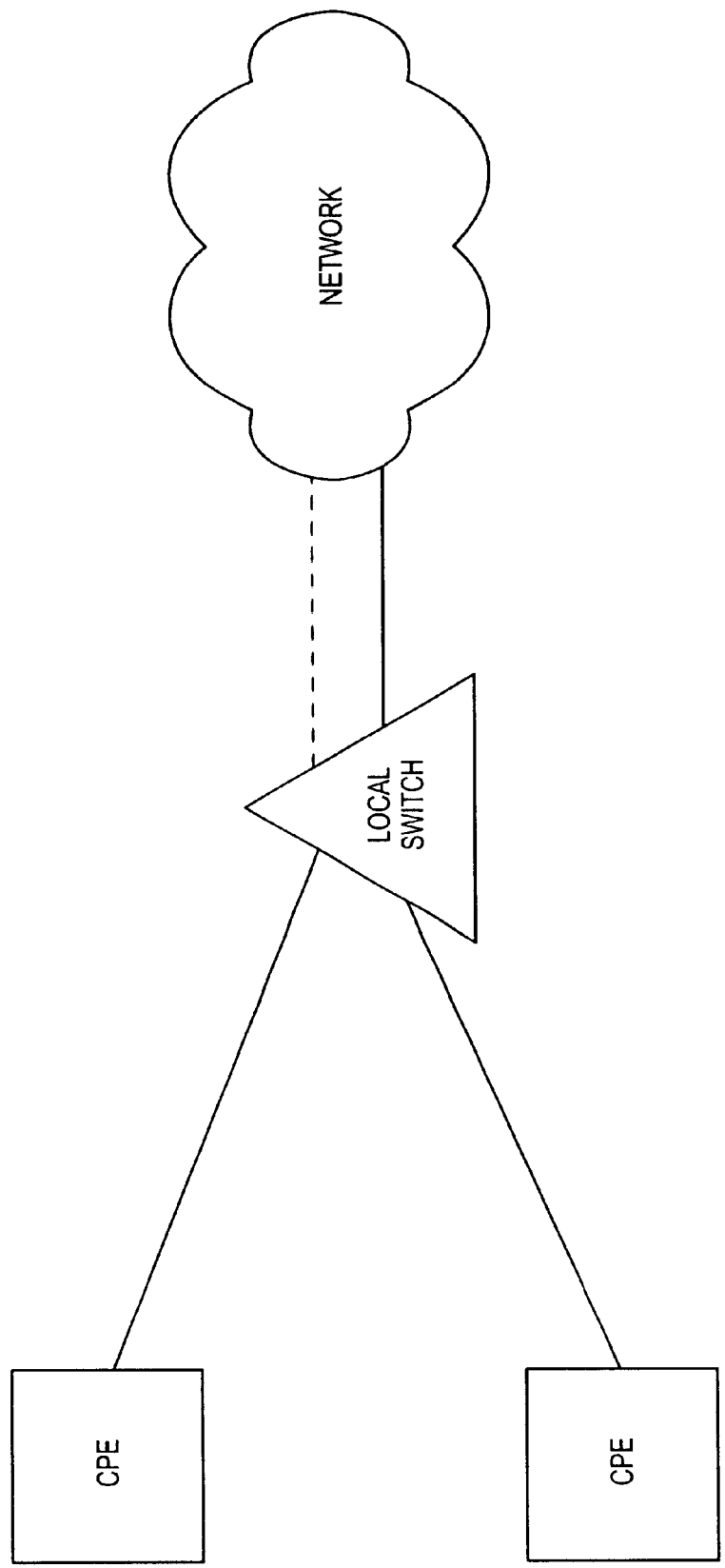
FIG. 1 is a block diagram of a version of the prior art.

FIG. 1 depicts the prior art arrangement discussed above for providing access to a telecommunications system. In this arrangement, Customer Premises Equipment (CPE) is typically connected over digital connections to the local switch. The digital signal is a Time Division Multiplexed (TDM) signal that is based on the Extended Superframe (ESF) format. The local switch accepts the TDM/ESF signal and provides the CPE with telecommunications service. All of these components and connections are well known in the art.

Figure 2:
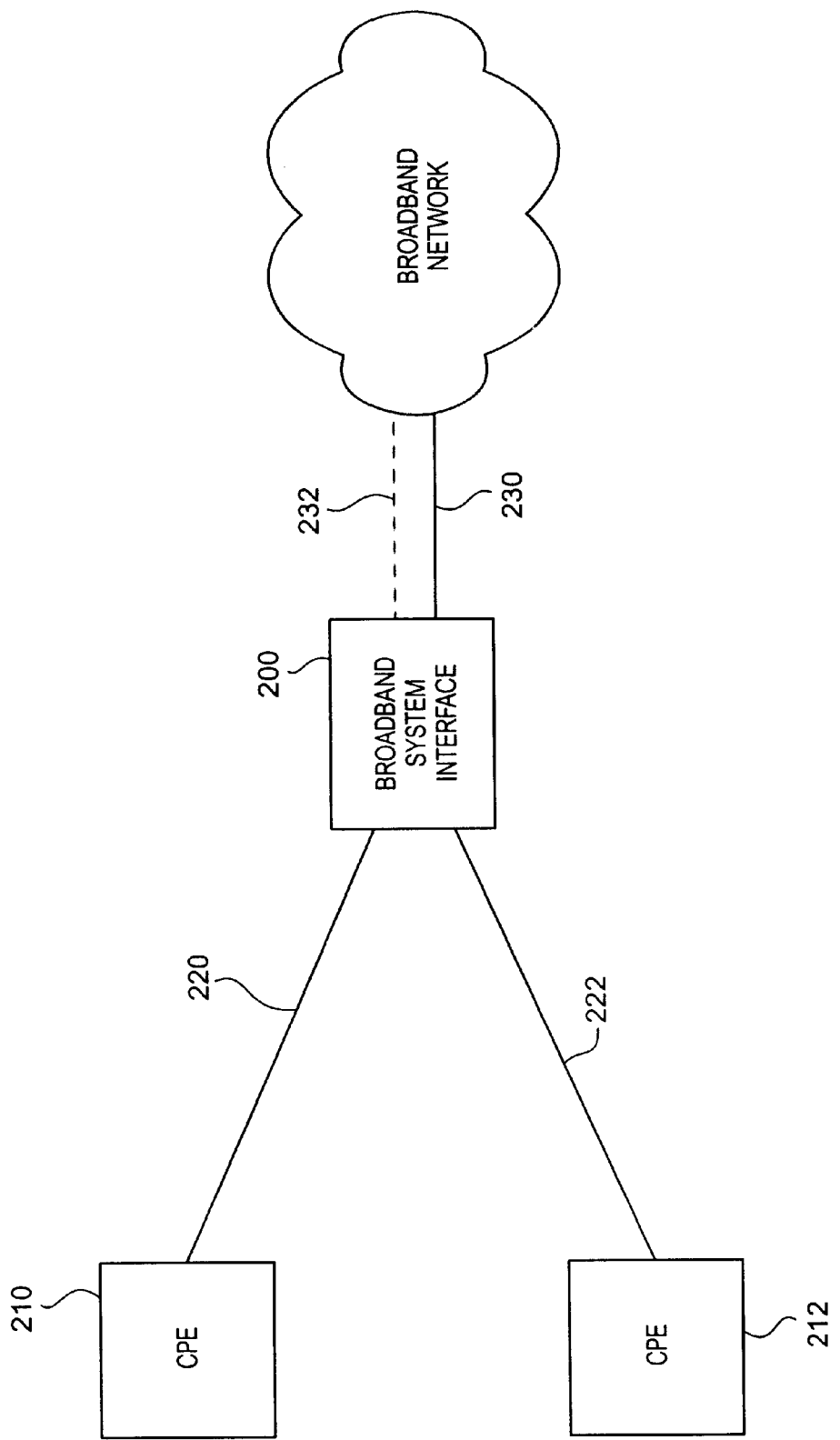
FIG. 2 is a block diagram of a version of the present invention.

FIG. 2 depicts a version of the invention. CPE 210 and 212 are shown connected to broadband system interface 200 over connections 220 and 222 respectively. CPE 210 and 212 provide services to many communications devices at the customer premises. Examples of these devices would include computers, modems, and facsimile machines. Connections 220 and 222 are ISDN connections or are connections based on any format that can be converted to ISDN. A common example would be TDM connections using the ESF format. Note that broadband system interface 200 replaces the local switch of FIG. 1.

Also shown are connection 230 and signaling link 232. Connection 230 is a broadband connection, for example a Synchronous Optical Network (SONET) connection carrying Asynchronous Transfer Mode (ATM) cells. Other broadband connections are also known and equally applicable. Signaling link 232 carries telecommunications signaling such as Signaling System #7 (SS7) messages. Connection 230 and link 232 are connected to a broadband network cloud that represents any number of network elements such as switches, enhanced platforms, and servers to name some examples.

The operation of broadband system 200 includes the conversion of bearer communications and signaling from one format into another. Bearer communications are the user information, for example, voice traffic. Signaling is information used by the network, for example, a called number. In some embodiments the conversion process is described with the term "interworking". This term is well known to those in the art. For example, ISDN signaling is interworked with SS7 signaling by converting ISDN signaling into analogous SS7 signaling and by converting SS7 signaling into analogous ISDN signaling. ISDN bearer communications are interworked with ATM communications by converting ISDN bearer communications into analogous ATM communications and by converting ATM communications into analogous ISDN bearer communications.

Broadband system interface 200 accepts calls from connections 220 and 222. If the calls are not in the ISDN format, they are converted to ISDN. The ISDN D channel signaling is then converted into SS7 signaling. The ISDN bearer communications are converted into broadband communications. Broadband system interface 200 processes the call signaling and routes the calls. Broadband system interface 200 may route calls to the other CPE connected broadband system interface 200. In addition, broadband interface system 200 may route calls over broadband connection 230 and associated signaling over link 232. Connection 230 and link 232 could connect callers to many other networks and network elements that provide numerous services.

It can be seen that broadband system interface 200 provides CPE with access to a broadband system. In can also be seen that broadband system 200 is capable of accepting calls in the standard formats currently accepted by local switches.

Figure 3:
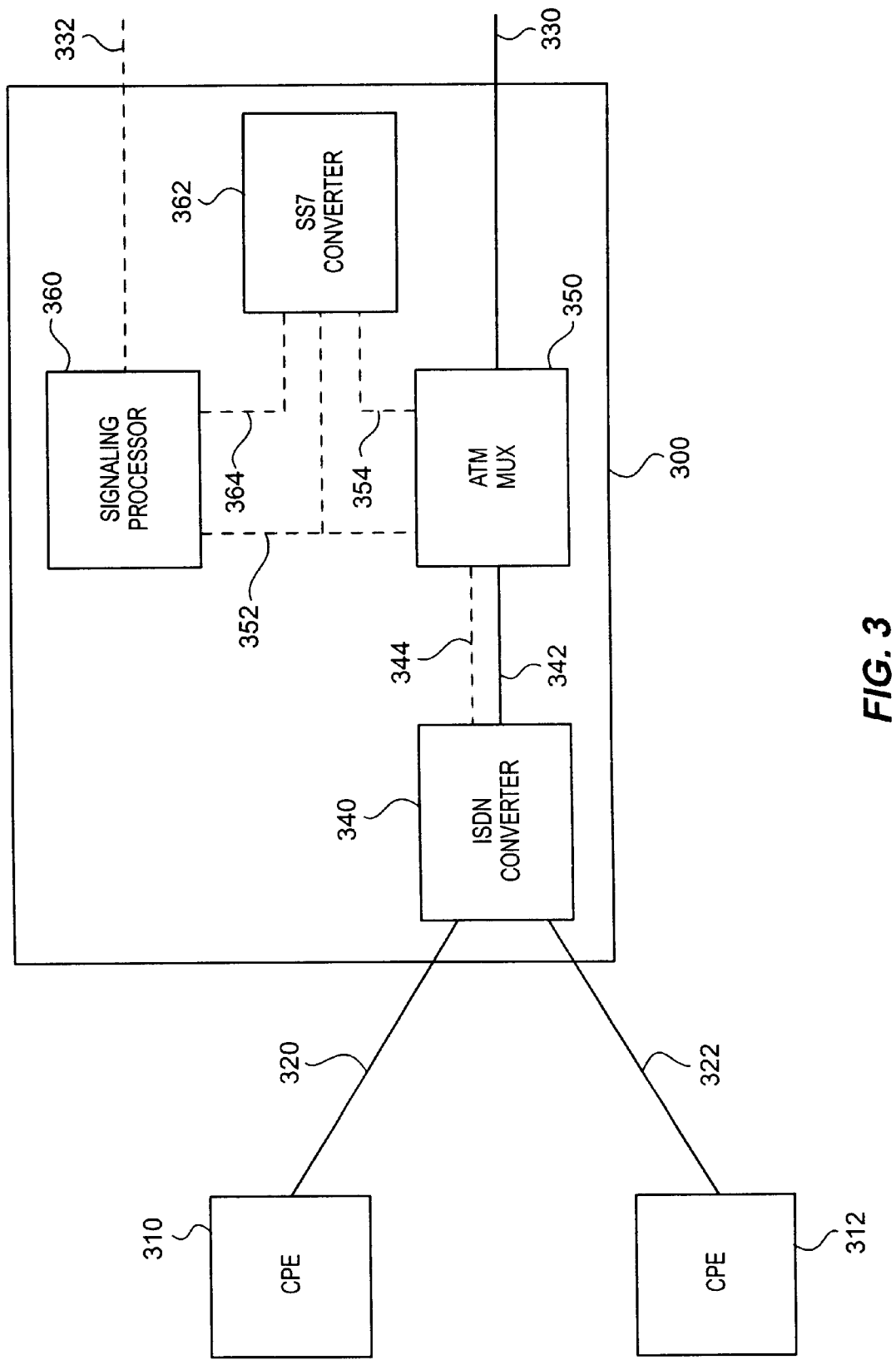
FIG. 3 is a block diagram of a version of the present invention.

FIG. 3 depicts a version of the invention—although those skilled in the art will appreciate other variations from this version that are also contemplated by the invention. Shown are CPE 310 and 312 and broadband system interface 300. Broadband system interface 300 is comprised of ISDN converter 340, ATM interworking multiplexer (mux) 350, signaling processor 360, and SS7 converter 362. CPE 310 is connected to ISDN converter 340 by connection 320. CPE 312 is connected to ISDN converter 340 by connection 322. Mux 350, signaling processor 360, and SS7 converter 362 are linked by link 352. Mux 350 and SS7 converter 362 are linked by link 354. Signaling processor 360 and SS7 converter 362 are linked by link 364. Mux 350 is also connected to connection 330 and signaling processor 360 is also linked to link 332.

CPE 310 and 312 could be any equipment that supplies traffic that can be converted into ISDN. A common example would be a PBX system providing a TDM/ESF traffic. Typically, CPE 310 and 312 would interface with communications devices at the customer premises and provide access to the network. CPE 310 and 312 are connected to ISDN converter 340 by connections 320 and 322. Connections 320 and 322 are any connections capable of carrying these communications. For example, they could be TDM/ESF connections that carry a multiplexed digital signal comprised of multiple bearer channels that carry caller communications. Embedded within the caller communications are signaling bits, known as ABCD bits.

Connections 342 and 344 represent an ISDN connection with connection 342 representing the bearer communications (B channels) and link 344 representing the signaling (D channel). Link 352 could be any link capable of transporting control messages. Examples of such a link could be SS7 links, UDP/IP or TCP/IP over ethernet, or a bus arrangement using a conventional bus protocol. Link 354 is any link that can carry an ISDN D channel. An example would be a T1 with the component DS0s carrying the ISDN D channels. Links 332 and 364 are any links capable of carrying SS7 messages. SS7 links are well known. Connection 330 is an ATM connection.

ISDN converter 340 is operational to interwork between non-ISDN formats and ISDN. For example, if a TDM/ESF signal is received over connection 320, ISDN converter 340 would use the ABCD signaling bits from the ESF signal to create the analogous ISDN signaling messages for the ISDN D-channel on connection 344. The bearer channels from connection 320 would be interworked into the B-channels of the ISDN signal on connection 342. The B-channels and the D-channel are provided to mux 350 over connection 342 and link 344 respectively. Connection 342 and link 344 are logically separated, but may traverse the same physical path. Devices with the base functionality of ISDN converter 340 are known in the art with an example being an ISDN interface provided by the Teleos company. One skilled in the art will appreciate how this functionality can be adapted to support the invention.

Mux 350 is operational to receive an ISDN signal over connection 342 and link 344. The B channels from connection 342 and the D channel from link 344 are in the well known DS0 format. Mux 350 is able to connect each DS0 to other DS0s. Mux 350 connects the DS0 from link 344 to the DS0 of link 354 to provide an ISDN D channel from ISDN converter 340 to SS7 converter 362. Mux 350 can also connect DS0s that carry bearer communications. For example, a DS0 from CPE 310 could be connected to a DS0 for CPE 312. Mux 350 makes the latter DS0 to DS0 connection in response to control instructions from signaling processor 360 that are received over link 352.

Mux 350 is also operational to convert DS0s into ATM cells with selected Virtual Path Identifiers/Virtual Channel Identifiers (VPI/VCIs). This conversion is known as ATM interworking. The ATM cells are transmitted over connection 330. Typically, they are provided to an ATM cross-connect device that routes the cells according to their VPI/VCI. Since DS0s are bi-directional, a companion VPI/VCI will typically be pre-assigned to the selected VPI/VCI to provide a call connection back to the caller. Mux 350 would convert ATM cells from this companion VPI/VCI into the return path of the DS0. Mux 350 makes the DS0/ATM conversions in response to control instructions from signaling processor 360 that are received over link 352. A detailed decryption of the mux is given below.

Signaling processor 360 and SS7 converter 362 form a signaling processing system that is operational to receive and process ISDN signaling to select call connections. It will be appreciated how these components can be integrated or remain discreet.

SS7 converter 362 interworks between ISDN signaling and Signaling System #7 (SS7) signaling. SS7 converter 362 exchanges D channel signaling with ISDN converter 340 over links 344 and 354 (through mux 340). SS7 converter 362 exchanges SS7 signaling with signaling processor 360 over link 364. SS7 converter also communicates with mux 350 over link 352. An example of such a communication would be an instruction to provide a ringback tone to the origination side of the call. Devices with the base functionality of SS7 converter 362 are known in the art. One skilled in the art will appreciate how this functionality can be adapted to support the invention Signaling processor 360 is operational to process signaling. The signaling processor will typically process an SS7 Initial Address Message (IAM) for call set-up. The IAM information is processed by signaling processor 360 in order to select a particular connection for a particular call. This connection might be a DS0 or a VPI/VCI. Signaling processor 360 sends control instructions over link 352 to mux 350 identifying the selected connections. The signaling processor exchanges SS7 signaling over links 364 and 332. A detailed description of the signaling processor follows below.

Figure 4:
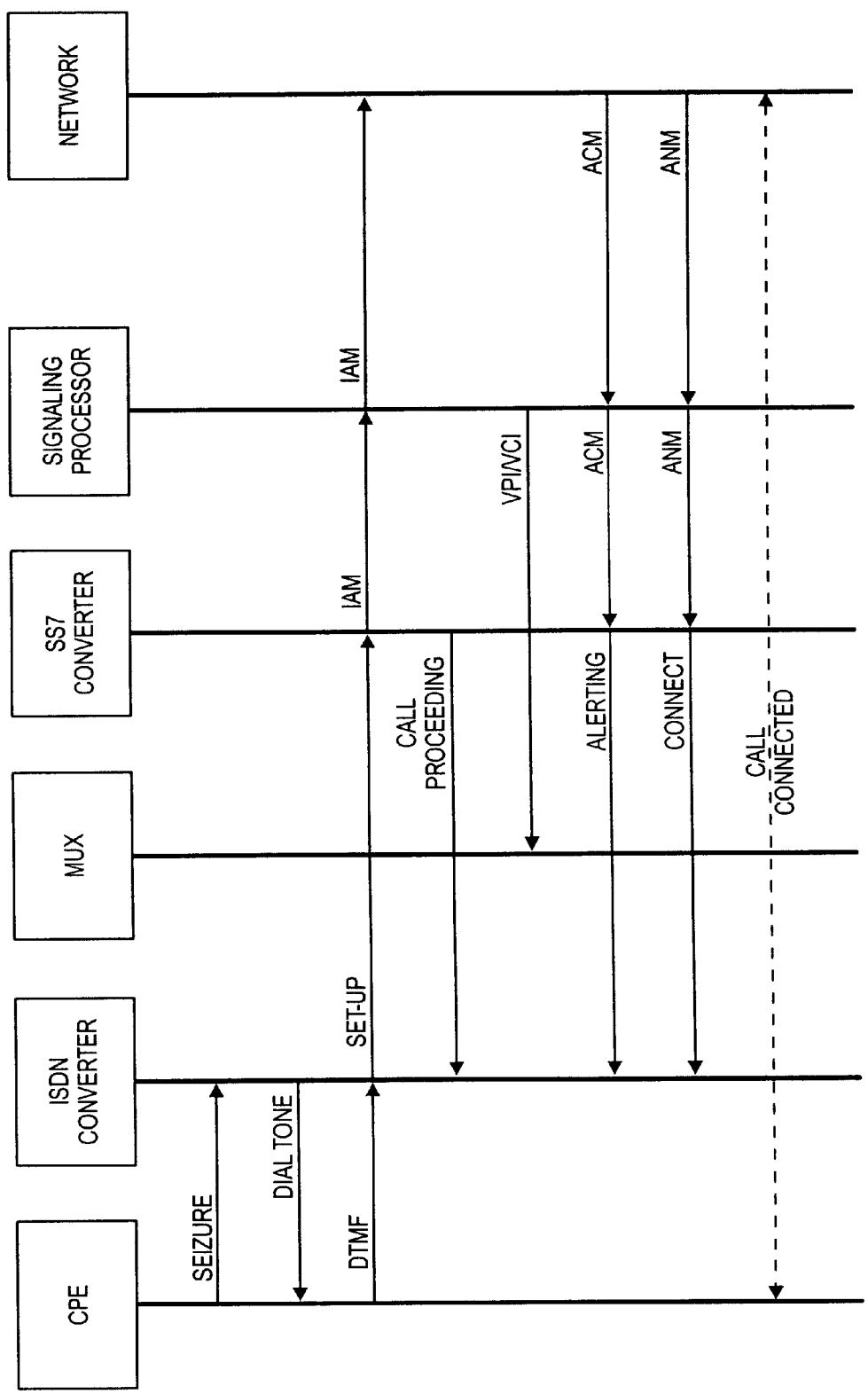
FIG. 4 is a message sequence chart for a version of the present invention.

FIG. 4 depicts the operation of the invention in the form of a message sequence chart. FIG. 4 depicts a call being placed from CPE to an entity across the country. The sequence starts with the CPE seizing a connection to the ISDN converter. The ISDN converter senses the seizure and returns dial tone. The CPE then forwards DTMF tones indicating a dialed number to the ISDN converter. The ISDN converter uses the DTMF input to generate an ISDN set-up message which it sends to the SS7 converter through the mux. (As the mux transfers all messages between the ISDN converter and the SS7 converter, express reference to this transfer will be omitted in the following discussions). The SS7 converter converts the ISDN set-up message into an analogous SS7 IAM and sends the SS7 IAM to the signaling processor.

The signaling processor processes the IAM and selects a connection. For a cross-country call, this connection would typically be a VPI/VCI provisioned to a long distance network. The signaling processor will generate an SS7 IAM and send it on to the relevant network element to extend the call. The SS7 converter sends an ISDN call proceeding message back to the ISDN converter. The signaling processor will generate a control instruction identifying the DS0 and the selected VPI/VCI and send it to the mux. Once the far end has received all information required for the call, it will return an SS7 Address Complete Message (ACM) to the signaling processor. The signaling processor will send an SS7 ANM to the SS7 converter, which will send an analogous ISDN alerting message to the ISDN converter.

If the called party answers, the signaling processor will receive an SS7 Answer Message (ANM) from the far end. The signaling processor will send an SS7 ANM message to the SS7 converter, and the SS7 converter will send an analogous ISDN connect message to the ISDN converter. At this point, the call is connected and a conversation, fax transmission, etc., may take place. The ISDN converter converts the bearer channel from the CPE into an ISDN DS0, and the mux converts this DS0 into ATM cells with the selected VPI/VCI. Additionally, the mux converts ATM cells from the companion VPI/VCI into the return path of the DS0.

As a result, the caller has access to an ATM system. This is accomplished by converting the traffic from the CPE into the ISDN format. The ISDN D channel signaling is converted into SS7 and the ISDN B channels are converted into ATM. Advantageously, the ATM virtual connection is selected on a call-by-call basis by the signaling processor. This allows the signaling processor to select a virtual connection that has been pre-provisioned to an appropriate destination.

Figure 5:
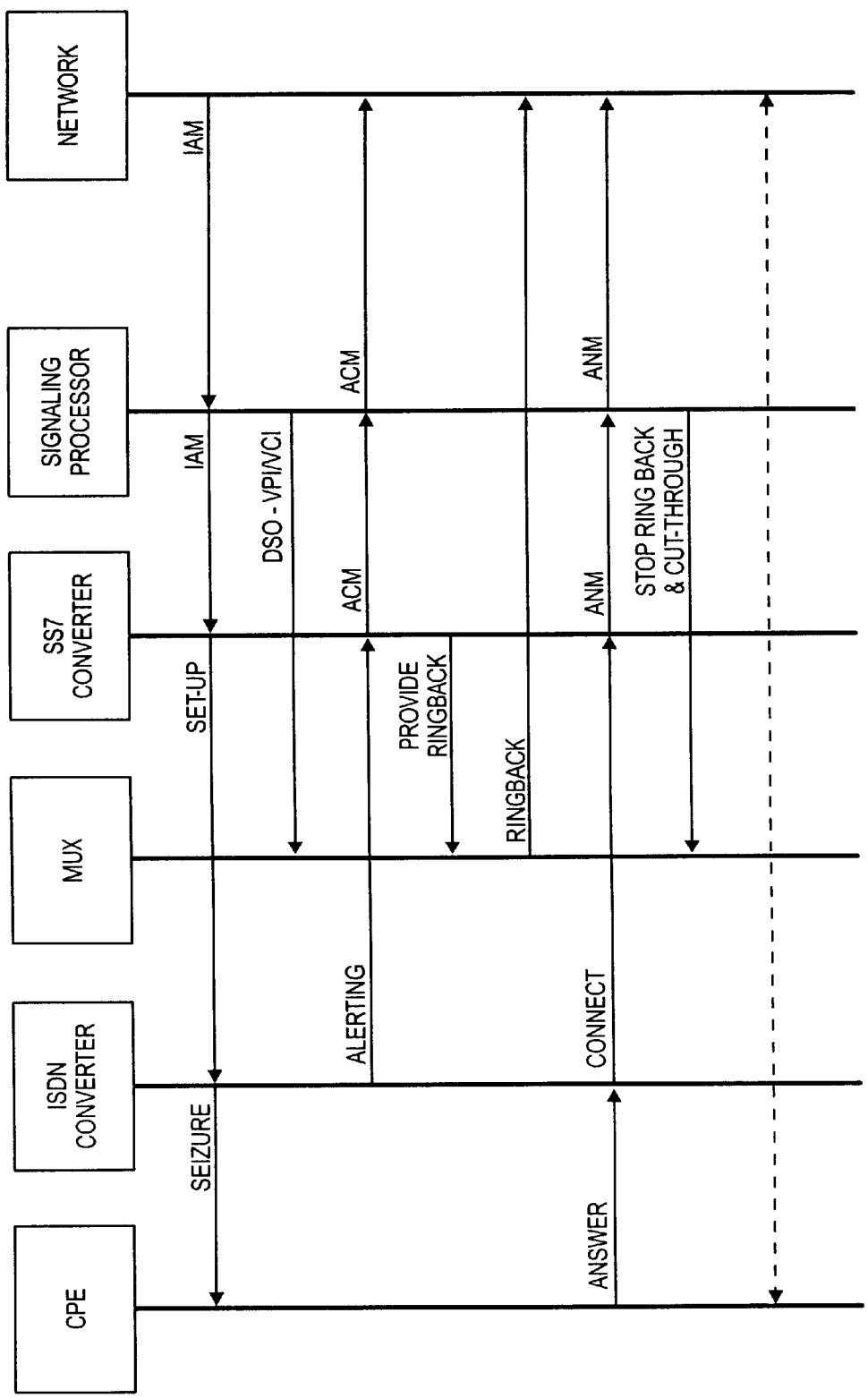
FIG. 5 is a message sequence chart for a version of the present invention.

FIG. 5 depicts a call from an entity across the country to the CPE. The sequence begins with an SS7 IAM from origination side of the call being received by the signaling processor. The signaling processor processes the IAM and selects the destination DS0. The signaling processor sends an IAM to the SS7 converter which forwards an analogous ISDN set-up message to the ISDN converter. The IAM and set-up message identifies the selected DS0 to use on the call.

The ISDN converter provides seizure to the telephone. The signaling processor also sends a control instruction to the mux indicating the VPI/VCI and selected DS0.

The ISDN converter will send an ISDN alerting message to the SS7 converter and the SS7 converter will send an analogous SS7 Address Complete Message (ACM) to the signaling processor. The signaling processor will send an SS7 ACM to the origination side of the call. The SS7 converter will send a control instruction to the mux to provide a ringback tone to the originating side of the call in order to indicate to the caller that the called party is being alerted. (This might be a busy signal where appropriate). The mux will provide ringback to the other side of the call.

When the ISDN converter senses that the telephone has been answered, it will send an ISDN connect message to the SS7 converter, and the SS7 converter will provide an analogous SS7 ANM to the signaling processor. The signaling processor will send an SS7 ANM to the originating side of the call. The signaling processor will instruct the mux to stop the ringback tone and provide cut-through on the call. At this point, the call is connected.

Figure 6:
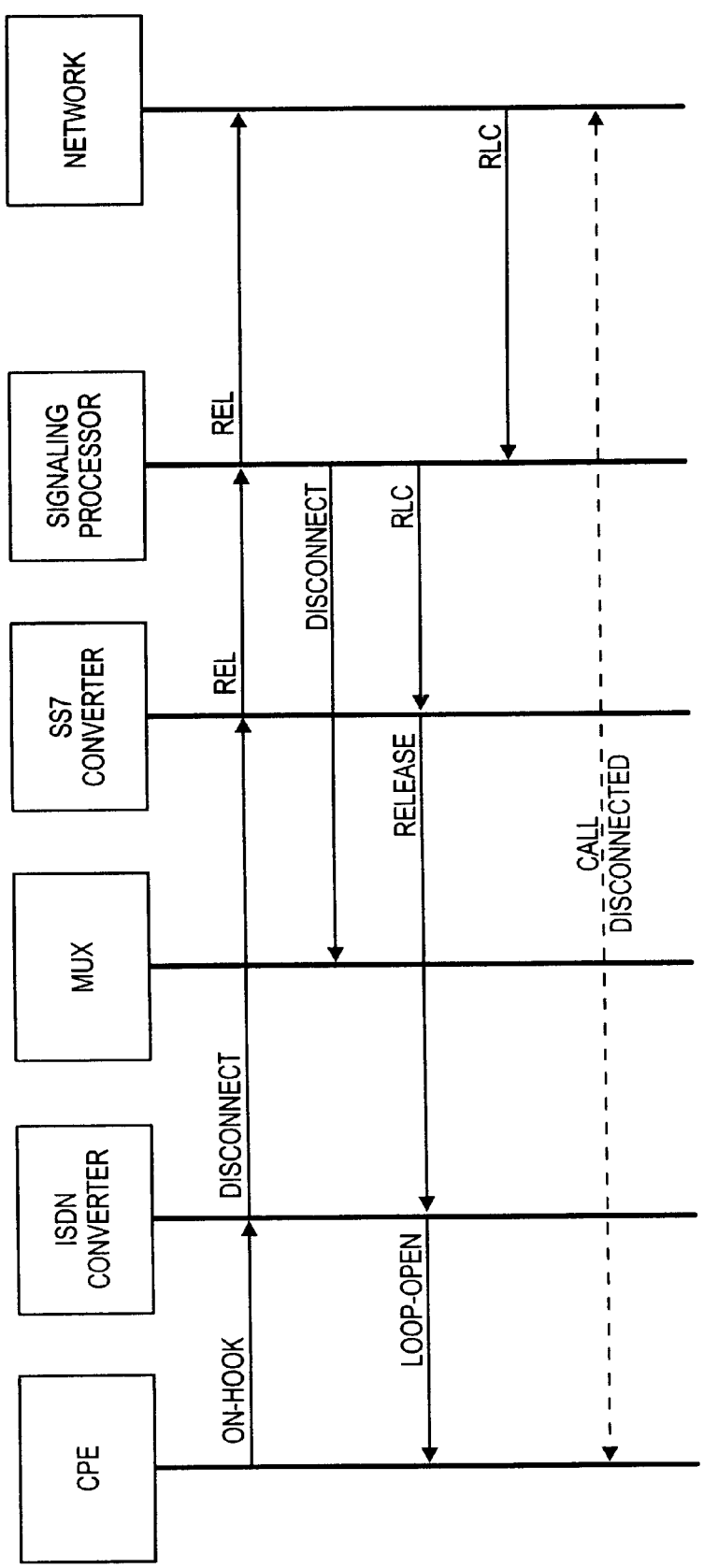
FIG. 6 is a message sequence chart for a version of the invention.
Figure 7:
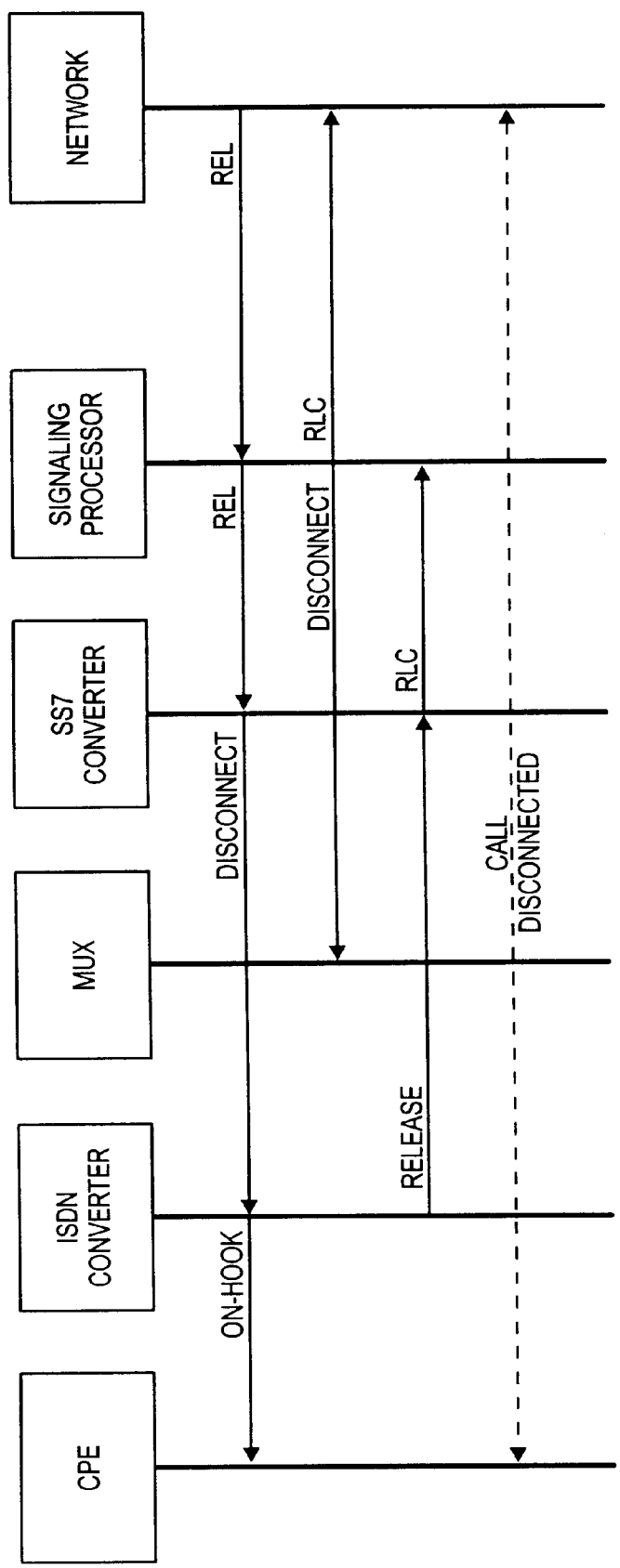
FIG. 7 is a message sequence chart for a version of the invention.

FIG. 6 depicts a call being cleared when the CPE of FIGS. 4 and 5 disconnects because the connected communications device hangs-up. The ISDN converter senses the on-hook and sends an ISDN disconnect message to the SS7 converter. The SS7 converter sends an analogous SS7 release (REL) message to the signaling processor. The signaling processor initiates release procedures and sends an SS7 REL to the other side of the call connection. In addition, the signaling processor sends an instruction to the mux to disconnect the DS0 and the VPI/VCI. The signaling processor will then send an SS7 Release Complete Message RLC to the SS7 converter. The SS7/ISDN converter will then send an ISDN release message to the ISDN converter which will provide a loop-open to the CPE. The far side will typically respond with a SS7 RLC to the signaling processor. At this point, the call is disconnected FIG. 7 depicts a call being cleared when the far end of the call hangs-up. The far end will send an SS7 REL to the signaling processor, and the signaling processor will initiate release procedures for the call. The signaling processor will send an SS7 REL to the SS7 converter, and the SS7 converter sends an analogous ISDN disconnect message to the ISDN converter. The ISDN converter provides an on-hook for the DS0 to the CPE. The signaling processor sends an control instruction to the mux to disconnect the DS0 from the VPL/VCI. The signaling processor also sends an SS7 RLC to the other side of the call. The ISDN converter will provide an ISDN release message to the SS7 converter. The SS7 converter will provide an analogous SS7 RLC to the signaling processor indicating that the connection has been cleared for re-use. At this point, the call is disconnected.

In FIGS. 4–7, the ISDN converter interfaces with the CPE to provide call capability. The ISDN converter also provides ISDN connections and signaling to the mux. The mux exchanges ISDN signaling between the ISDN converter and the SS7 converter. The mux also interfaces between the ISDN component DS0s and ATM. The SS7 converter converts the signaling between the ISDN and the SS7 format and exchanges SS7 messages with the signaling processor. The signaling processor processes the SS7 signaling and responds to the SS7 converter with SS7 messages. The signaling processor also issues commands to the mux to facilitate the call. Typically this is an assignment of a DS0 to a VPI/VCI. The signaling processor also provides SS7 messages to the network at large. The mux handles DS0 to ATM conversions in response to signaling processor commends.

As a result the CPE is provided with an interface to a broadband system. The network is able to provide this interface and provide a selected ATM connection on a call-by-call basis—all without the need for an ATM switch. Such a system provides a distinct advantage over prior systems. The invention is applicable to any CPE protocols that can be converted into ISDN. In some embodiments, the CPE themselves may even provide ISDN traffic.

FIGS. 8–12 depict various alternative arrangements of the invention, but the invention is not limited to these alternatives. Those skilled in the art will appreciate how the variations of FIGS. 8–12 could be combined in many different arrangements that are all contemplated by the invention.

Figure 8:
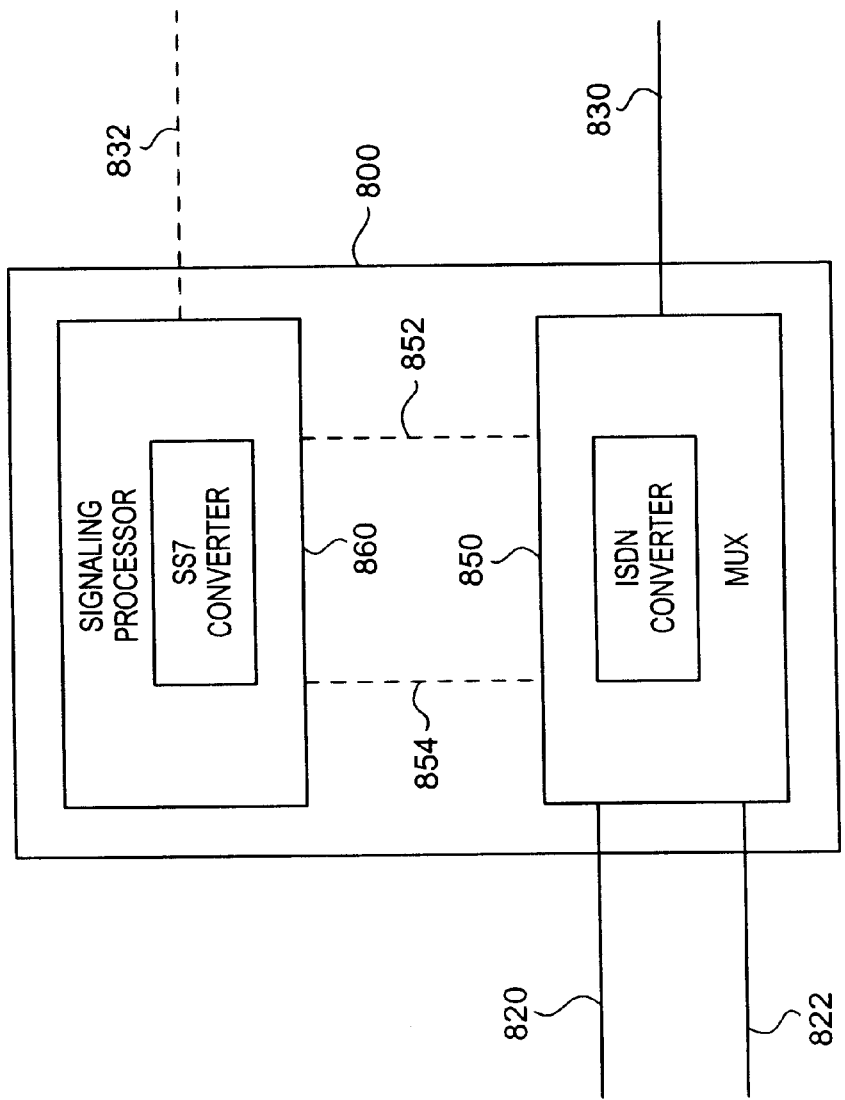
FIG. 8 is a block diagram of a version of the invention.

FIG. 8 depicts broadband system interface 800 that is comprised of mux 850, links 852 and 854, and signaling processor 860. Also shown are link 832 and connections 820, 822, and 830. These components are configured and operate as described above for the corresponding reference numbers of FIG. 3, except that the ISDN converter has been incorporated into mux 850 and the SS7 converter has been incorporated into signaling processor 860.

Figure 9:
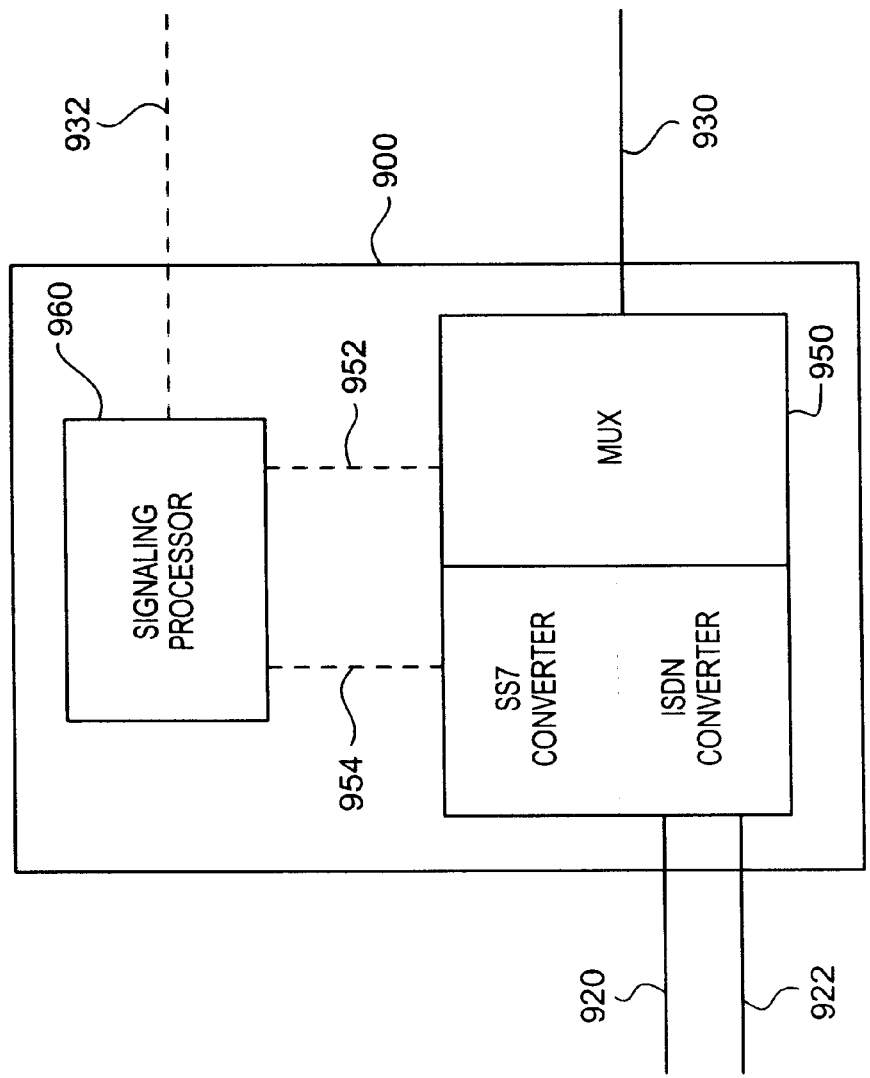
FIG. 9 is a block diagram of a version of the invention.

FIG. 9 depicts broadband system interface 900 that is comprised of mux 950, links 952 and 954, and signaling processor 960. Also shown are link 932 and connections 920, 922, and 930. These components are configured and operate as described above for the corresponding reference numbers of FIG. 3, except that both the ISDN converter and the SS7 converter have been incorporated into mux 950.

Figure 10:
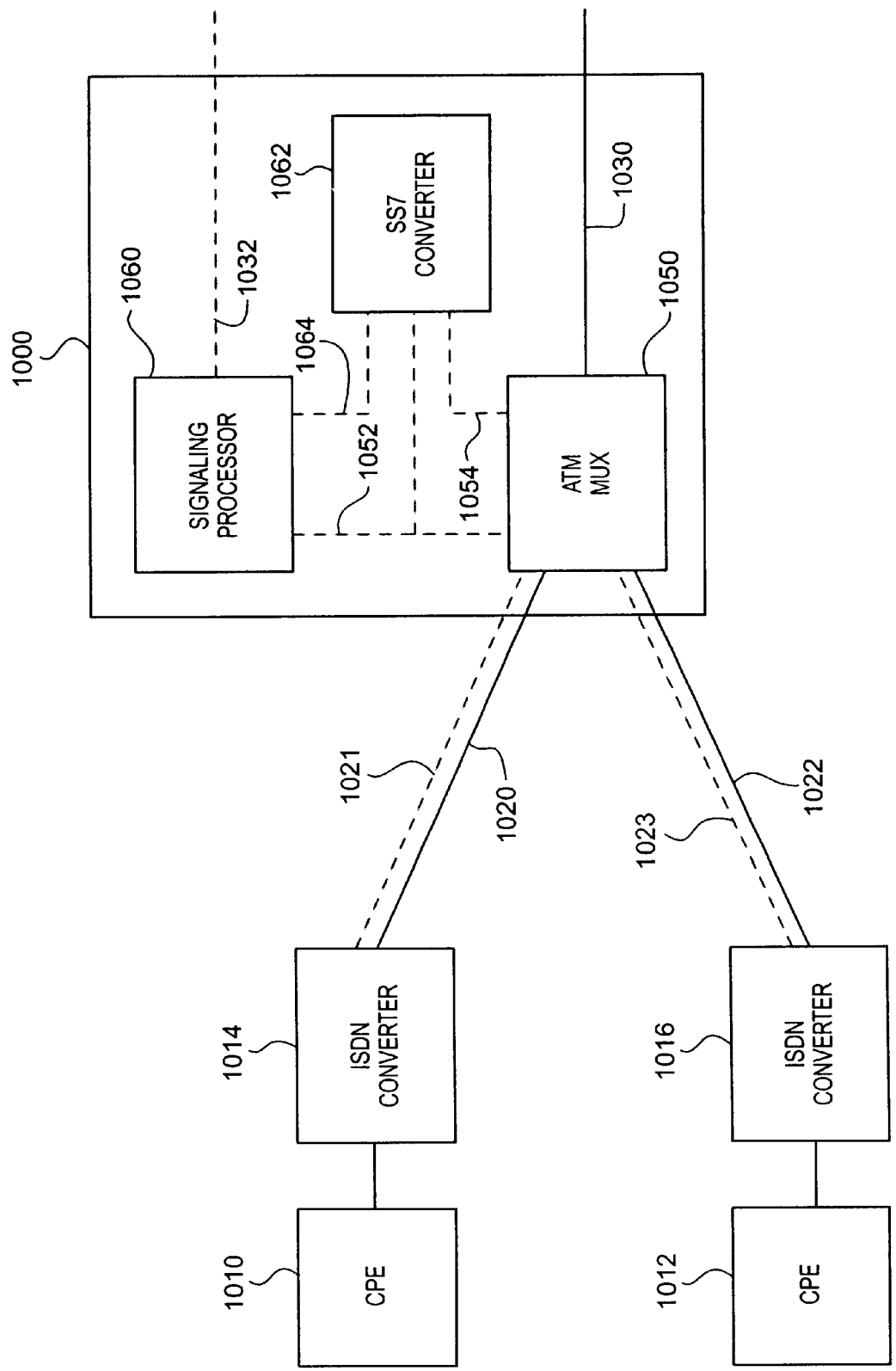
FIG. 10 is a block diagram of a version of the invention.

FIG. 10 depicts broadband system interface 1000 that is comprised of mux 1050, links 1052, 1054 and 1064, signaling processor 1060, and SS7 converter 362. Also shown are link 1032 and connection 1030. These components are configured and operate as described above for FIG. 3, except the ISDN converters have been moved outside of system 1000. For example, they could be located at the customer premises. ISDN converter 1014 is connected to CPE 1010 and ISDN converter 1016 is connected to CPE 1012 by ESF connections. Connections 1020 and 1022 carry the B channels and links 1021 and 1023 carry the D channels. Mux 1050 interfaces with ISDN converters 1014 and 1016 over these connections. In this way, the invention provides ISDN systems with an interface to a broadband system. As required by the invention, the ISDN signaling is converted into SS7 before it is processed by the signaling processor.

Figure 11:
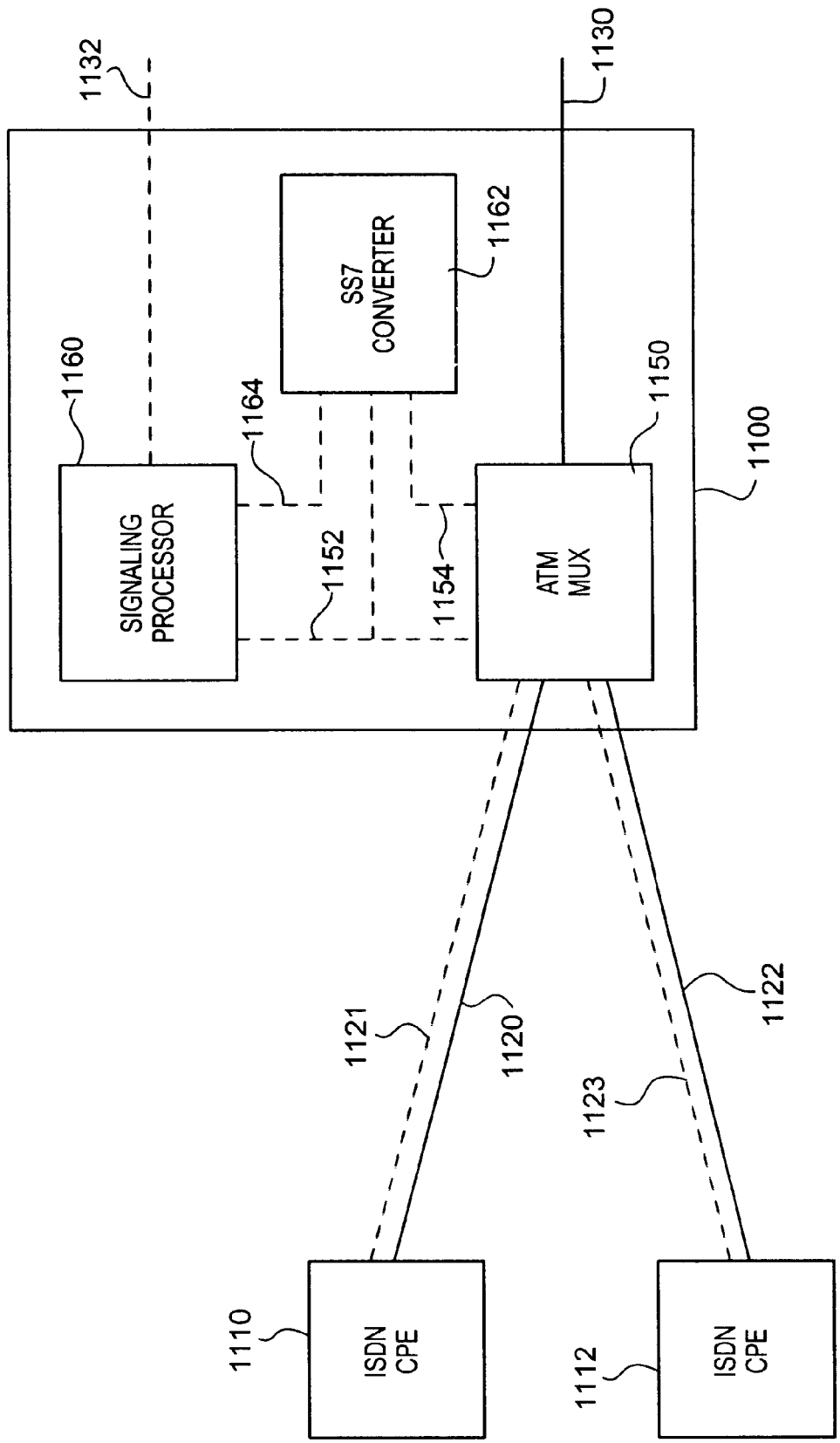
FIG. 11 is a block diagram of a version of the invention.

FIG. 11 depicts broadband system interface 1100 that is comprised of mux 1150, links 1152, 1154, and 1164, signaling processor 1160, and SS7 converter 1162. Also shown are connection 1130 and link 1132. These components are configured and operate as described above for the corresponding reference numbers of FIG. 3. In this embodiment, CPE 1110 and 1112 are capable of providing ISDN traffic so that the ISDN converter and conversion processes can be omitted. Connections 1120 and 1122 carry the B channels and links 1121 and 1123 carry the D channels. Mux 1150 interfaces directly with ISDN CPE 1110 and 1112. In this way, the invention provides ISDN systems with an interface to a broadband system. As required by the invention, the ISDN signaling is converted into SS7 before it is processed by the signaling processor.

Figure 12:
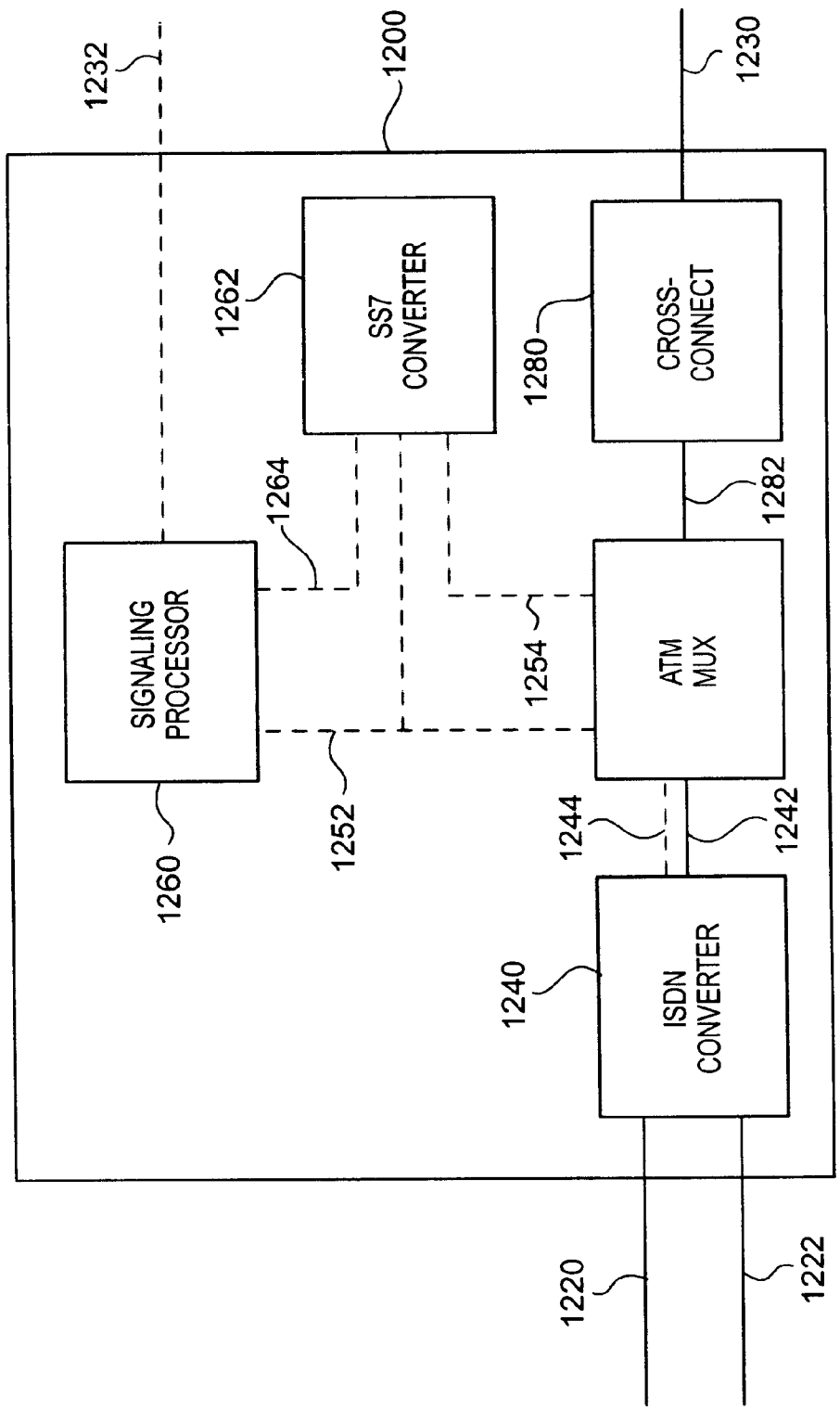
FIG. 12 is a block diagram of a version of the invention.

FIG. 12 depicts broadband system interface 1200 that is comprised of mux 1250, links 1244, 1252, 1254, and 1264, signaling processor 1260, and SS7 converter 1262. Also shown are link 1232 and connections 1220, 1222, 1242, and 1230. These components are configured and operate as described above for the corresponding reference numbers of FIG. 3, except that ATM cross-connect 1280 and connection 1282 have been added. ATM cross-connect 1280 is a conventional ATM cross-connect, such as an NEC model 20. ATM cross-connect 1280 provides a plurality of pre-provisioned VPI/VCI connections for mux 1250 over ATM connection 1282. These VPI/VCIs could be pre-provisioned through ATM cross-connect 1280 to a plurality of destinations. Example include switches, servers, enhanced platforms, customer premises equipment, and other muxes. The addition of cross-connect 1280 demonstrates how the selection of VPI/VCIs by the signaling processor on a call-by-call basis allows broadband system interface 1200 to route calls to selected destinations over pre-provisioned broadband connections.

This call-by-call selection and use of virtual connections is accomplished without the need for an ATM switch or call-by-call control over the cross-connect. This provides a distinct advantage over current ATM switch based systems in terms of cost and control. ATM switches are typically very expensive and control over the switch is relegated to the switch supplier. In the invention, the signaling processor exerts the control, and the signaling processor does not need to be obtained from an ATM switch supplier.

The ATM Interworking Multiplexer

Figure 13:
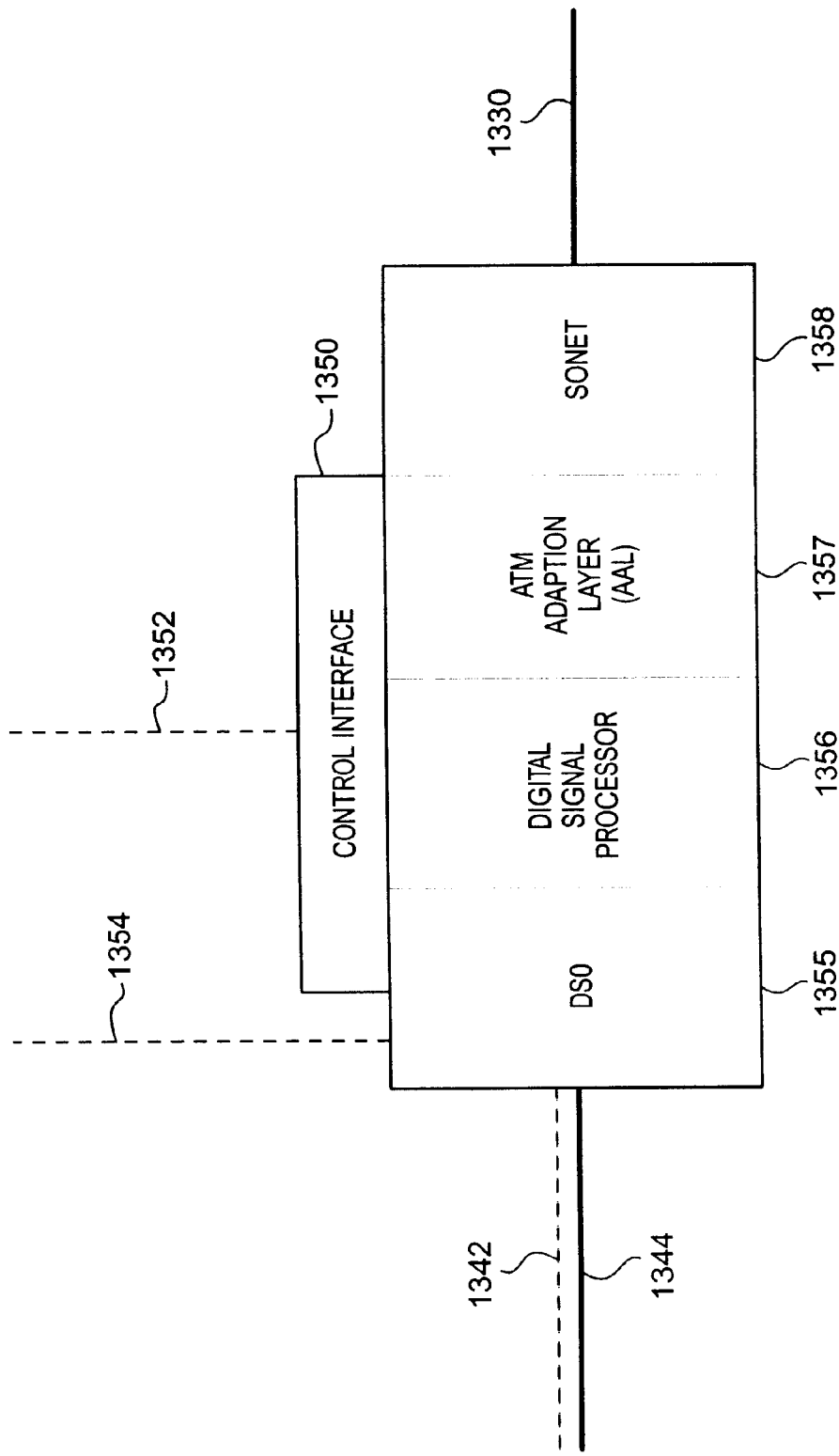
FIG. 13 is a block diagram of for a version of the invention.

FIG. 13 shows one embodiment of the mux that is suitable for the present invention, but other muxes that support the requirements of the invention are also applicable. Shown are control interface 1350, DS0 interface 1355, digital signal processor 1356, ATM adaption layer (AAL) 1357, and SONET interface 1358. SONET interface 1358 accepts ATM cells from AAL 1340 and transmits them over connection 1330. Connection 1330 is a SONET connection, such as an OC-3 connection. Control interface 1350 exchanges control messages between the signaling processor, the signaling converter, and the elements of the mux over link 1352.

DS0 interface 1355 accepts an ISDN signal over link 1342 and connection 1344. DS0 interface 1355 connects the incoming D channel DS0 from link 1342 to the D channel DS0 of link 1354 to the SS7 converter. DS0 interface 1355 receives the B channel DS0s and handles them in accord with signaling processor instructions received through control interface 1350. This would include interconnecting particular DS0s to other DS0s on particular calls. It would also include connecting particular DS0s to particular functions of digital signal processor 1356. It would also include bypassing digital signal processor 1356 and directly coupling DS0s to AAL 1357.

Digital signal processor 1356 is operational to apply various digital processes to particular DS0s in response to control instructions received through control interface 1354. Examples of digital processing include: tone detection, tone transmission, loopbacks, voice detection, voice messaging, echo cancellation, compression, and encryption. For example, the signaling processor may instruct the mux to provide a ringback tone, and then to apply echo cancellation.

Digital signal processor 1356 is connected to AAL 1357. AAL 1357 comprises both a convergence sublayer and a segmentation and reassembly (SAR) layer. AAL 1357 is operational to accept calls in DS0 format and convert the DS0 information into ATM cells. AALs are known in the art and information about AALs is provided by International Telecommunications Union (ITU) document I.363. An AAL for voice is also described in patent application Ser. No. 08/395,745, filed on Feb. 28, 1995, entitled "Cell Processing for Voice Transmission", and hereby incorporated by reference into this application. AAL 1357 obtains the virtual path identifier (VPI) and virtual channel identifier (VCI) for each call from control interface 1350. AAL 1357 also obtains the identity of the DS0 for each call (or the DS0s for an N×64 call). Control interface 1350 receives these instructions from the signaling processor. AAL 1357 then converts user information between the identified DS0 and the identified ATM virtual connection. Acknowledgments that the assignments have been implemented may be sent back to the signaling processor if desired. Calls with a bit rate that are a multiple of 64 kbit/second are known as N×64 calls. If desired, AAL 1357 can be capable of accepting control messages through control interface 1350 for N×64 calls. The signaling processor would instruct AAL 1357 to group the DS0s for the call.

As discussed above, the mux also handles calls in the opposite direction—from SONET interface 1358 to DS0 interface 1355. For this traffic, the VPI/VCI has already been selected and the traffic routed through the cross-connect. As a result, AAL 1357 needs only to identify the DS0 for that particular VPI/VCI. The signaling processor could provide this assignment through control interface 1350 to AAL 1357. A technique for processing VPI/VCIs is disclosed in patent application Ser. No. 08/653,852, filed on May 28, 1996, entitled "Telecommunications System with a Connection Processing System", and hereby incorporated by reference into this application.

DS0 connections are bi-directional and ATM connections are typically uni-directional. As a result, two virtual connections in opposing directions will typically be required for each DS0. Those skilled in the art will appreciate how this can be accomplished in the context of the invention. For example, the broadband system could be provisioned with a second set of VPI/VCIs in the opposite direction as the original set of VPI/VCIs. On each call, the mux would be configured to automatically invoke this second VPI/VCI to provide a bi-directional virtual connection to match the bi-directional DS0 on the call.

In some embodiments, digital signal processor 1356 could be omitted from the mux. In these embodiments, the mux could not collect digits or control echo. DS0 interface 1355 would connect DS0s directly to AAL 1357.

In some embodiments, the B channel DS0 to DS0 connection capability could be omitted. The D channel DS0s would still be connected, but if a B channel DS0 needed connected to another B channel DS0, the signaling processor would need to select a VPI/VCI that is pre-provisioned through a cross-connect and back to this same mux. The mux would then convert the returning cells to the other DS0.

As a result the CPE is provided with an interface to a broadband system. The network is able to provide this interface and provide a selected ATM connection on a call-by-call basis—all without the need for an ATM switch. Such a system provides a distinct advantage over prior systems. Although, the invention has been described in terms of ESF, those skilled in the art will appreciate that the invention is applicable to other protocols that can be converted into ISDN. The CPE themselves may even provide ISDN traffic. The invention requires that signaling be converted from ISDN into SS7 before it is processed by the signaling processor.

The Signaling Processor

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. Patent Application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it can also validate callers, control echo cancelers, generate billing information, invoke intelligent network functions, access remote databases, manage traffic, and balance network loads. One skilled in the art will appreciate how the CCM described below can be adapted to operate in the above embodiments.

Figure 14:
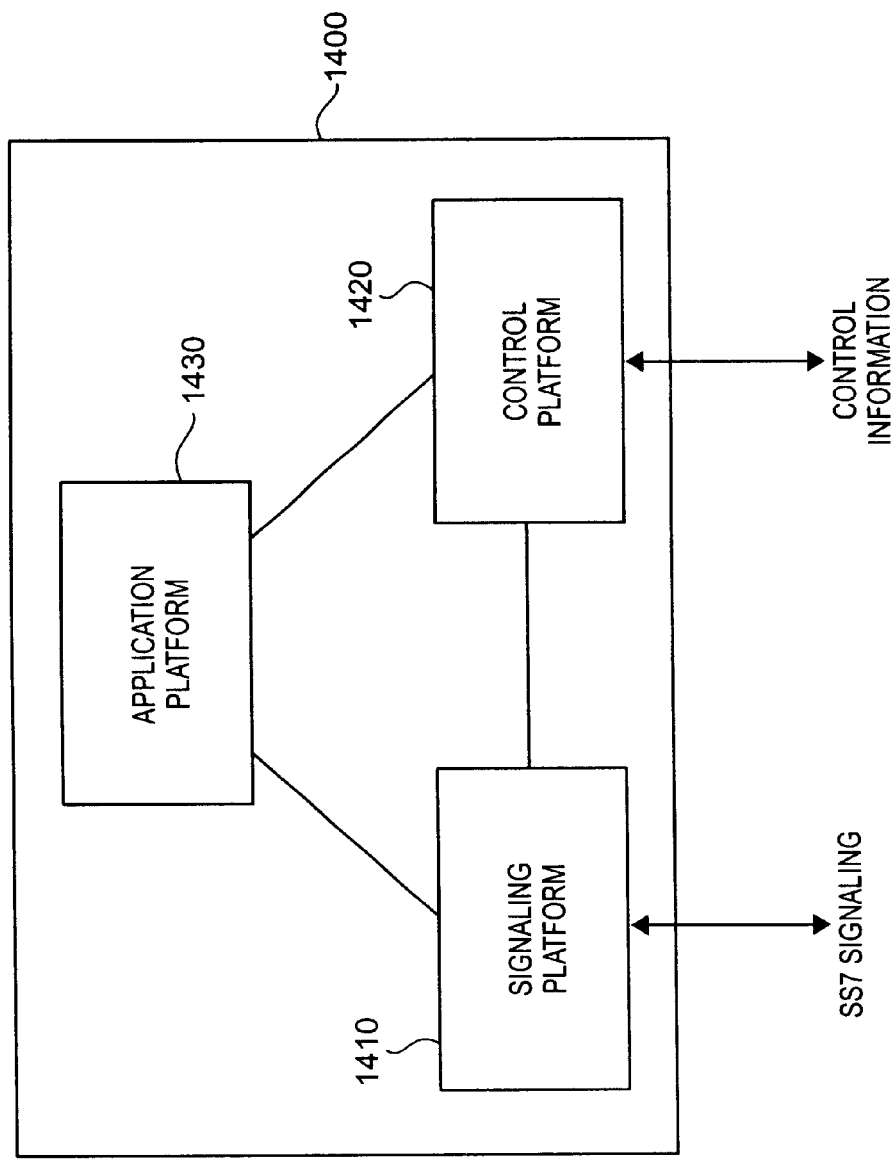
FIG. 14 is a block diagram of a version of the present invention.

FIG. 14 depicts a version of the CCM. Other versions are also contemplated. In the embodiment of FIG. 14, CCM 400 controls an ATM interworking multiplexer (mux) that performs interworking of DS0s and VPI/VCIs. However, the CCM may control other communications devices and connections in other embodiments.

CCM 1400 comprises signaling platform 1410, control platform 1420, and application platform 1430. Each of the platforms 1410, 1420, and 1430 is coupled to the other platforms.

Signaling platform 1410 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). Control platform 1420 is externally coupled to a mux control, an echo control, a resource control, billing, and operations.

Signaling platform 1410 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

Control platform 1420 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation or particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of CCM 1400. One skilled in the art will appreciate how to produce the software for the interfaces in control platform 1420.

Application platform 1430 is functional to process signaling information from signaling platform 1410 in order to select connections. The identity of the selected connections are provided to control platform 1420 for the mux interface. Application platform 1430 is responsible for validation, translation, routing, call control, exceptions, screening, and error handling. In addition to providing the control requirements for the mux, application platform 1430 also provides requirements for echo control and resource control to the appropriate interface of control platform 1420. In addition, application platform 1430 generates signaling information for transmission by signaling platform 1410. The signaling information might be ISUP, NAP, or TCAP messages to external network elements. Pertinent information for each call is stored in a call control block (CCB) for the call. The CCB can be used for tracking and billing the call.

Application platform 1430 operates in general accord with the Basic Call Model (BCM) defined by the ITU. An instance of the BCM is created to handle each call. The BCM includes an originating process and a terminating process. Application platform 1430 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for application platform 1430 can be produced in specification and description language (SDL) defined in ITU-T Z.100. The SDL can be converted into C code. Additional C and C++ code can be added as required to establish the environment.

CCM 1400 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 14, it can be seen that application platform 1430 processes signaling information to control numerous systems and facilitate call connections and services. The SS7 signaling is exchanged with external components through signaling platform 1410, and control information is exchanged with external systems through control platform 1420. Advantageously, CCM 1400 is not integrated into a switch CPU that is coupled to a switching matrix. Unlike an SCP, CCM 1400 is capable of processing ISUP messages independently of TCAP queries.

SS7 Message Designations

SS7 messages are well known. Designations for various SS7 messages commonly are used. Those skilled in the art are familiar with the following message designations:
ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.
CCM Tables Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 15:
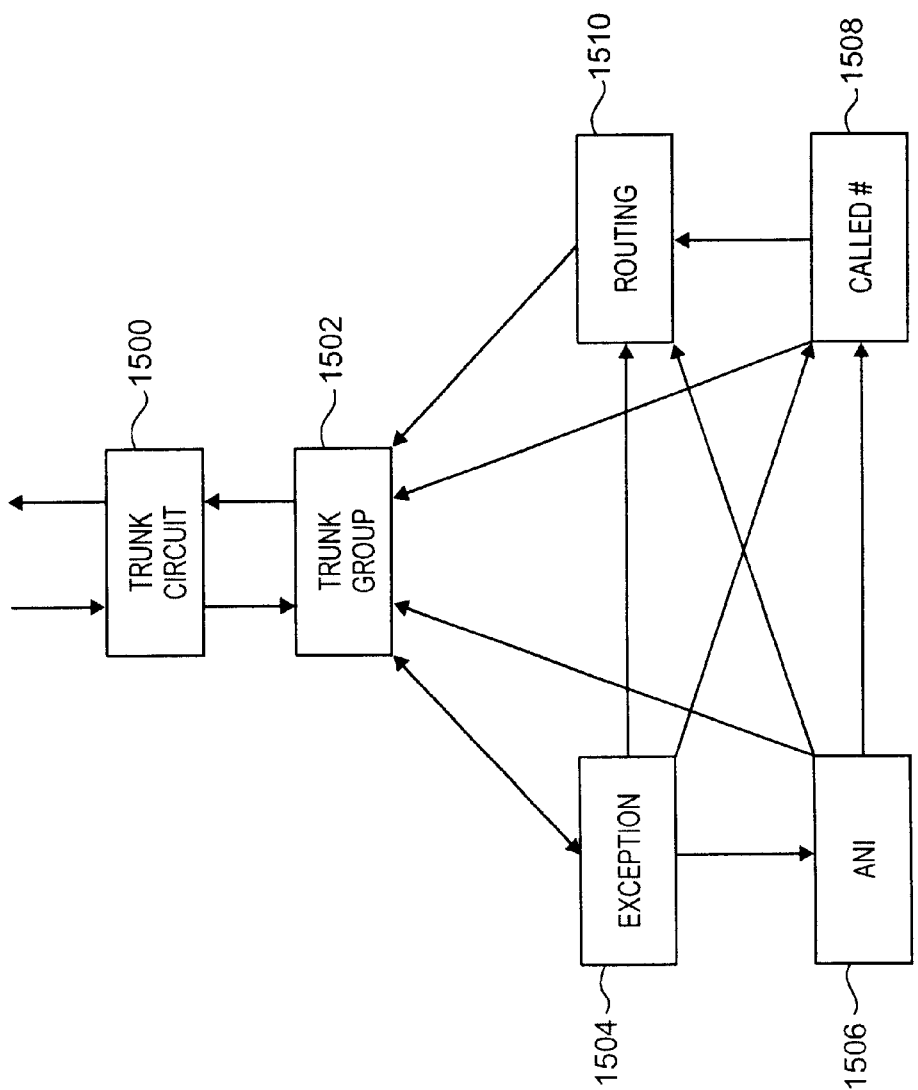
FIG. 15 is a logic diagram of a version of the present invention.

FIG. 15 depicts a data structure used by application platform 1430 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 1500, trunk group table 1502, exception table 1504, ANI table 1506, called number table 1508, and routing table 1510.

Trunk circuit table 1500 contains information related to the connections. Typically, the connections are DS0 or ATM connections. Initially, trunk circuit table 1500 is used to retrieve information about the originating connection. Later, the table is used to retrieve information about the terminating connection. When the originating connection is being processed, the trunk group number in trunk circuit table 1500 points to the applicable trunk group for the originating connection in trunk group table 1502.

Trunk group table 1502 contains information related to the originating and terminating trunk groups. When the originating connection is being processed, trunk group table 1502 provides information relevant to the trunk group for the originating connection and typically points to exception table 1504.

Exception table 1504 is used to identify various exception conditions related to the call that may influence the routing or other handling of the call. Typically, exception table 1504 points to ANI table 1506. Although, exception table 1504 may point directly to trunk group table 1502, called number table 1508, or routing table 1510.

ANI table 1506 is used to identify any special characteristics related to the caller's number. The callers number is commonly known as automatic number identification (ANI). ANI table 1506 typically points to called number table 1508. Although, ANI table 1506 may point directly to trunk group table 1502 or routing table 1510.

Called number table 1508 is used to identify routing requirements based on the called number. This will be the case for standard telephone calls. Called number table 1508 typically points to routing table 1510. Although, it may point to trunk group table 1502.

Routing table 1510 has information relating to the routing of the call for the various connections. Routing table 1510 is entered from a pointer in either exception table 1504, ANI table 1506, or called number table 1508. Routing table 1510 typically points to a trunk group in trunk group table 1502.

When exception table 1504, ANI table 1506, called number table 1508, or routing table 1510 point to trunk group table 1502, they effectively select the terminating trunk group. When the terminating connection is being processed, the trunk group number in trunk group table 1502 points to the trunk group that contains the applicable terminating connection in trunk circuit table 1502.

The terminating trunk circuit is used to extend the call. The trunk circuit is typically a VPI/VCI or a DS0. Thus it can be seen that by migrating through the tables, a terminating connection can be selected for a call.

Figure 16:
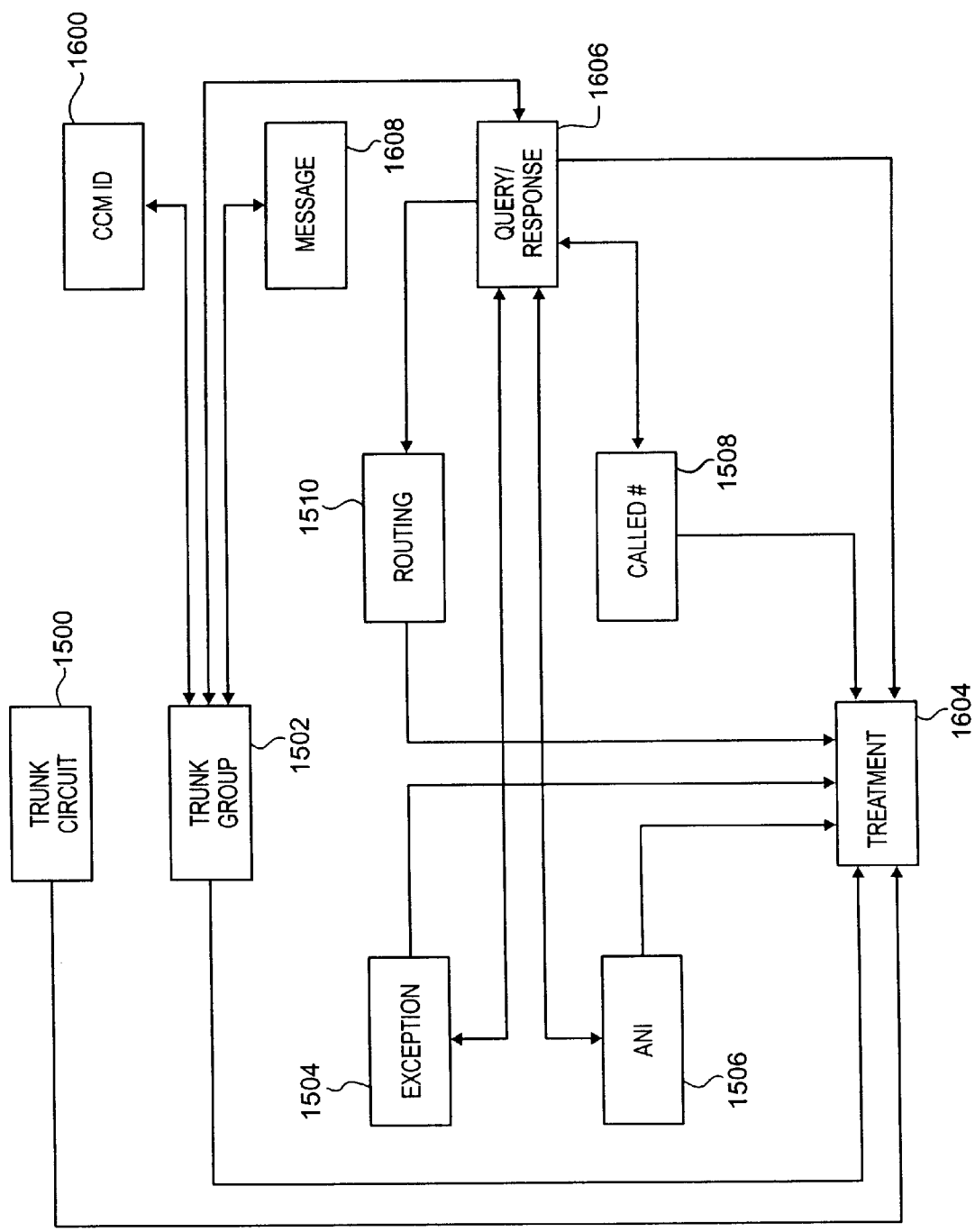
FIG. 16 is a logic diagram of a version of the present invention.

FIG. 16 is an overlay of FIG. 15. The tables from FIG. 15 are present, but for clarity, their pointers have been omitted. FIG. 16 illustrates additional tables that can be accessed from the tables of FIG. 15. These include CCM ID table 1600, treatment table 1604, query/response table 1606, and message table 1608.

CCM ID table 1600 contains various CCM SS7 point codes. It can be accessed from trunk group table 1502, and it points back to trunk group table 1502.

Treatment table 1604 identifies various special actions to be taken in the course of call processing. This will typically result in the transmission of a release message (REL) and a cause value. Treatment table 1604 can be accessed from trunk circuit table 1500, trunk group table 1502, exception table 1504, ANI table 1506, called number table 1508, routing table 1510, and query/response table 1606.

Query/response table 1606 has information used to invoke the SCF. It can be accessed by trunk group table 1502, exception table 1504, ANI table 1506, called number table 1508, and routing table 1510. It points to trunk group table 1502, exception table 1504, ANI table 1506, called number table 1508, routing table 1510, and treatment table 1604.

Message table 1608 is used to provide instructions for messages from the termination side of the call. It can be accessed by trunk group table 1502 and points to trunk group table 1502.

FIGS. 17–24 depict examples of the various tables described above. FIG. 17 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 18 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 19 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining, digits. The next function and next index entries point to the next table which is typically the ANI table.

FIG. 20 depicts an example of the ANI table. The index is used to enter the table. The calling party category differentiates among types of calling parties, for example, test calls, emergency calls, and ordinary calls. The calling party/charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 21 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 9. The next function and next index point to the next table which is typically the routing table.

FIG. 22 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 17–22 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 23 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 24 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

We claim:

1. A telecommunications system that provides an interface between a broadband system and an ISDN system for a telecommunications call, the telecommunications system comprising:

a signaling processor that is operational to process SS7 signaling, to select a broadband connection for the call, and to provide a control message that identifies the selected broadband connection and causes an ATM multiplexer to convert the ISDN bearer communications into broadband bearer communications;

a signaling converter that is operational to convert ISDN signaling into the SS7 signaling and to provide the SS7 signaling to the signaling processor;

the ATM multiplexer that is operational to receive the ISDN signaling from the ISDN system and to provide the ISDN signaling to the signaling converter, to receive the ISDN bearer communications from the ISDN system and to receive the control message from the signaling processor, to convert the ISDN bearer communications into the broadband bearer communications in response to receiving the control message, and to transmit the broadband bearer communications to the broadband system on the selected broadband connection based on the control message; and a first link between the ATM multiplexer and the signaling converter that is operational to carry the ISDN signaling, a second link between the signaling converter and the signaling processor that is operational to carry SS7 signaling, and a third link between the signaling processor and the ATM multiplexer that is operational to carry the control messages.

2. The system of claim 1 wherein the system provides an interface between the broadband system and the ISDN system for another telecommunications call wherein:

the signaling processor is further operational to process other signaling from the broadband system for the other call, to select an ISDN connection for the other call, to provide another control message for the other call that identifies the selected ISDN connection, and to provide other SS7 signaling for the other call to the signaling converter;

the signaling converter is further operational to convert the other SS7 signaling into other ISDN signaling and to provide the other ISDN signaling to the ATM multiplexer;

the ATM multiplexer is further operational to provide the other ISDN signaling to the ISDN system, to receive other broadband communications for the other call from the broadband system, to receive the other control message from the signaling processor, to convert the other broadband communications into other ISDN communications, and to transmit the other ISDN communications to the ISDN system on the selected ISDN connection based on the other control message.

3. The system of claim 1 wherein the signaling processor is also operational to exchange Signaling System #7 (SS7) signaling with the broadband system.

4. The system of claim 1 wherein the broadband system is an ATM system.

5. A telecommunications system for use between an Asynchronous Transfer Mode (ATM) system and a ISDN system for telecommunications calls, the telecommunications system comprising:

a signaling processing system that is operational to process call signaling from the ISDN system and from the ATM system, to select at least one of an ISDN connection and an ATM connection for each call, and to provide control messages that identify the selected connections and cause an ATM multiplexer to interwork bearer communications between the ISDN system and the ATM system on the selected connections; and the ATM multiplexer that is operational to exchange the call signaling between the ISDN system and the signaling processing system, to receive the control messages from the signaling processing system, and to interwork bearer communications between the ISDN system and the ATM system on the selected connections in response to receiving the control messages.

6. The system of claim 5 wherein the signaling processing system is also operational to interwork the ISDN signaling and Signaling System #7 (SS7) signaling.

7. The system of claim 5 wherein the signaling processing system is also operational to interwork ISDN set-up messages and Signaling System #7 (SS7) Initial Address Messages (IAMs).

8. The system of claim 5 wherein the signaling processing system is also operational to process a Signaling System #7 (SS7) Initial Address Message to select the ATM connection.

9. The system of claim 5 wherein the selected ATM connection is provisioned through an ATM cross-connect before the call.

10. The system of claim 5 wherein the signaling processing system is also operational to process a Signaling System #7 (SS7) Initial Address Message to select the ISDN connection.

11. The system of claim 5 wherein the ISDN connection is designated by a DS0.

12. The system of claim 5 further comprising an ATM cross-connect coupled to the ATM multiplexer.

13. The system of claim 5 wherein the signaling processing system is further operational to exchange Signaling System #7 (SS7) signaling with the ATM system.

14. The system of claim 5 wherein the ATM multiplexer is further operational to provide ringback.

15. The system of claim 5 wherein the ATM multiplexer is further operational to interwork between ISDN signaling and Signaling System #7 (SS7) signaling.

16. The system of claim 5 wherein the ATM multiplexer is further operational to interwork between communications and signaling from another system and ISDN bearer communications and ISDN signaling.

17. The system of claim 5 further including at least one link between the signaling processing system and the ATM multiplexer that is operational to carry the ISDN signaling and the control messages.

18. A telecommunications system that interworks between an Asynchronous Transfer Mode (ATM) system and a ISDN for telecommunication calls, the telecommunications system comprising:

a signaling processor that is operational to process SS7 signaling, to select at least one of an ISDN connection and an ATM connection for each call, and to provide control messages that identify the selected connections and cause an ATM multiplexer to interwork bearer communications between the ISDN system and the ATM system on the selected connections;

a signaling converter that is operational to interwork ISDN signaling and SS7 signaling and to exchange SS7 signaling with the signaling processor; and an ATM multiplexer that is operational to exchange ISDN signaling between the ISDN system and the signaling converter, to receive the control messages from the signaling processor, and to interwork bearer communications between the ISDN system and the ATM system on the selected connections in response to receiving the control messages.

19. The system of claim 18 further comprising a first link between the ATM multiplexer and the signaling converter that is operational to carry the ISDN signaling, a second link between the signaling converter and the signaling processor that is operational to carry SS7 signaling, and a third link between the signaling processor and the ATM multiplexer that is operational to carry the control messages.

20. A telecommunications system that interworks between an Asynchronous Transfer Mode (ATM) system and another communications system for telecommunications calls, the telecommunication system comprising:

an ISDN converter that is operational to interwork between bearer communications and signaling from the other communications system and ISDN bearer communication and ISDN signaling, a signaling processing system that is operational to process the ISDN signaling and signaling from the ATM system, to select at least one of an ISDN connection and an ATM connection for each call, and to provide control messages that identify the selected connections and cause an ATM multiplexer to interwork the bearer communications between the ISDN converter and the ATM system on the selected connections;

an ATM multiplexer that is operational to exchange the ISDN signaling between the ISDN converter and the signaling processing system, to receive the control messages from the signaling processing system, and to interwork the bearer communications between the ISDN converter and the ATM system on the selected connections in response to receiving the control messages;

at least one link between the ATM multiplexer and the signaling processing system that is operational to carry the ISDN signaling and the control messages, and at least one connection between the ISDN converter and the ATM multiplexer that is operational to carry the ISDN bearer communications and the ISDN signaling.

21. A telecommunications system that interworks between an Asynchronous Transfer Mode (ATM) system and another communications system for telecommunications call, the telecommunications system comprising:

a signaling processor that is operational to process SS7 signaling, to select at least one of an ISDN connection and an ATM connection for each call, and to provide control messages that identify the selected connections and cause an ATM multiplexer to interwork bearer communications between the ISDN converter and the ATM system on the selected connections;

an ISDN converter that is operational to interwork the bearer communications and signaling from the other communications system with ISDN bearer communication and ISDN signaling;

an SS7 converter that is operational to interwork the ISDN signaling and the SS7 signaling and to exchange the SS7 signaling with the signaling processor;

an ATM multiplexer that is operational to exchange the ISDN signaling between the ISDN converter and the SS7 converter, to receive the control messages from the signaling processor, and to interwork the bearer communications between the ISDN converter and the ATM system on the selected connections in response to receiving the control messages;

a linking means between the ATM multiplexer and the SS7 converter for carrying the ISDN signaling, between the SS7 converter and the signaling processor for carrying the SS7 signaling, and between the signaling processor and the ATM multiplexer for carrying the control messages; and a connection between the ATM multiplexer and the ISDN converter that is operational to carry the ISDN bearer communications and the ISDN signaling.

22. A telecommunications system for use between an Asynchronous Transfer Mode (ATM) system and a ISDN system for telecommunications calls, the telecommunications system comprising:

a signaling processing system that is operational to process call signaling from the ISDN system and from the ATM system, to select at least one of an ISDN connection and an ATM connection for each call, and to provide control messages that identify the selected connections and cause an ATM multiplexer to interwork bearer communications between the ISDN system and the ATM system on the selected connections; and the ATM multiplexer that is operational to exchange the call signaling between the ISDN system and the signaling processing system, to receive the control messages from the signaling processing system, to interwork bearer communications between the ISDN system and the ATM system on the selected connections in response to receiving the control messages, and to interconnect other incoming bearer communications from the ISDN system with other outgoing bearer communications to the ISDN system based on the control messages.

23. A method for operating a telecommunications system that interworks between an ISDN system and an Asyncronous Transfer Mode (ATM) system for telecommunications calls, the method comprising:

receiving ISDN signaling and ISDN bearer communications into the telecommunications system;

converting the ISDN signaling into Signaling System #7 (SS7) signaling;

processing the SS7 signaling to select ATM connections; and interworking the ISDN bearer communications with the selected ATM connections.

24. The method of claim 23 further comprising:

receiving SS7 signaling and ATM communications into the telecommunications system;

processing the SS7 signaling to select ISDN connections; and interworking the ATM communications with the selected ISDN connections.

25. The method of claim 23 further comprising:

receiving additional ISDN signaling and additional ISDN bearer communications into the telecommunications system;

converting the additional ISDN signaling into additional Signaling System #7 (SS7) signaling;

processing the additional SS7 signaling to select ISDN connections; and interconnecting the additional ISDN bearer communications with the selected ISDN connections.

26. A method for operating a telecommunications system that interworks between an ISDN system and an Asyncronous Transfer Mode (ATM) system for a telecommunications calls from callers, the method comprising:

receiving ISDN set-up messages from the ISDN system into the telecommunications system;

converting the ISDN set-up messages into Signaling System #7 (SS7) Initial Address Messages (IAMs);

processing the SS7 IAMs to select ATM connections to the ATM system;

receiving ISDN bearer communications from the ISDN system;

interworking the ISDN bearer communications with the selected ATM connections to the ATM system.

27. The method of claim 26 further comprising:

receiving other SS7 IAMs from the ATM system into the telecommunications system;

processing the other SS7 IAMs to select ISDN connections;

receiving ATM communications from the ATM system;

interworking the ATM communications with the selected ISDN connections.

28. The method of claim 26 further comprising:

receiving additional ISDN set-up messages from the ISDN system into the telecommunications system;

converting the additional ISDN set-up messages into additional Signaling System #7 (SS7) Initial Address Messages (IAMs);

processing the additional SS7 IAMs to select ISDN connections to the ISDN system;

receiving ISDN bearer communications from the ISDN system;

interconnecting the additional ISDN bearer communications with the selected ISDN connections to the ISDN system.

29. A method for operating a telecommunications system that interworks between an Asyncronous Transfer Mode (ATM) system and a non-ISDN system for telecommunications calls, the method comprising:

receiving signaling and bearer communications from the non-ISDN system into the telecommunications system;

converting the non-ISDN signaling and non-ISDN bearer communications into ISDN signaling and ISDN bearer communications;

converting the ISDN signaling into Signaling System #7 (SS7) signaling;

processing the SS7 signaling to select ATM connections; and interworking the ISDN bearer communications with the selected ATM connections.

30. The method of claim 29 further comprising:

receiving SS7 signaling and ATM communications into the telecommunications system;

processing the SS7 signaling to select ISDN connections;

interworking the ATM communications with the selected ISDN connections;

converting the ISDN bearer communications and the ISDN signaling from the ISDN connection into non-ISDN bearer communications and non-ISDN signaling.

31. The method of claim 29 wherein the non-ISDN system is an Extended Superframe (ESF) system.

32. The method of claim 29 wherein the non-ISDN system is a Superframe (SF) system.

\* \* \* \* \*

UNITED STATES PATENT AND TRADEMARK OFFICE
CERTIFICATE OF CORRECTION

PATENT NO. : 6,430,195 B1  
DATED : August 6, 2002  
INVENTOR(S) : Joseph Michael Christie, deceased, Michael Joseph Gardner, Tracy Lee Nelson, William Lyle Wiley and AlbertDaniel Duree It is certified that error appears in the above-identified patent and that said Letters Patent is hereby corrected as shown below:

<u>Title page,</u>
Item [63], Related U.S. Application Data, should read
-- [63] Continuation-in-part of application No. 08/525,897, filed on Sep. 8, 1995, now Pat. No. 5,991,301, which is a continuation of application No. 08/238,605, filed on May 5, 1994. --

Signed and Sealed this

Tenth Day of December, 2002

JAMES E. ROGAN
*Director of the United States Patent and Trademark Office*